(12) United States Patent
More et al.

(10) Patent No.: US 12,689,669 B1
(45) Date of Patent: Jul. 21, 2026

(54) ADAPTIVE STREAM MANAGEMENT

(71) Applicant: Marvell Asia Pte Ltd, Singapore (SG)

(72) Inventors: Shankar More, Pune (IN); Sumit Sharma, Pune (IN)

(73) Assignee: Marvell Asia Pte Ltd, Singapore (SG)

( * ) Notice: Subject to any disclaimer, the term of this patent is extended or adjusted under 35 U.S.C. 154(b) by 138 days.

(21) Appl. No.: 18/484,188

(22) Filed: Oct. 10, 2023

Related U.S. Application Data

(60) Provisional application No. 63/417,686, filed on Oct. 19, 2022.

(51) Int. Cl.
  H04L 65/75 (2022.01)

(52) U.S. Cl.
  CPC .................................... H04L 65/75 (2022.05)

(58) Field of Classification Search
  None
  See application file for complete search history.

(56) References Cited

U.S. PATENT DOCUMENTS

2006/0136639 A1 * 6/2006 Futral ................. G06F 13/4291
                                        710/244
2008/0212583 A1 * 9/2008 Rey ....................... H04L 12/189
                                        370/390
2015/0277794 A1 * 10/2015 Tudor ................... G06F 3/0619
                                        711/103
2016/0182391 A1 * 6/2016 Theobald ................ H04L 47/39
                                        370/230
2021/0406191 A1 * 12/2021 Radi ................... H04L 41/0661
2026/0046317 A1 * 2/2026 Crabtree ................ H04L 63/20

* cited by examiner

*Primary Examiner* — Tonia L Dollinger
*Assistant Examiner* — Ishrat Rashid
(74) *Attorney, Agent, or Firm* — Colby Nipper PLLC

(57) ABSTRACT

The present disclosure describes apparatuses and methods for implementing adaptive stream management. In aspects, an adaptive stream manager receives a read request from a host with an indication for a stream transaction of multiple reads of data from media coupled to a media controller. The adaptive stream manager determines a priority level for the stream transaction based on an identifier of the host and a quality-of-service indicator of the read request and allocates a stream identifier to the host for the read request based on the priority level determined. The stream transaction is then initiated to prefetch, from the media, respective data of at least one of the multiple reads to a cache of the media controller. By so doing, aspects of adaptive stream management can prioritize stream transactions among hosts to efficiently manage resources of the controller and improve processing of stream transactions and other data access requests.

20 Claims, 18 Drawing Sheets

Figure 1:
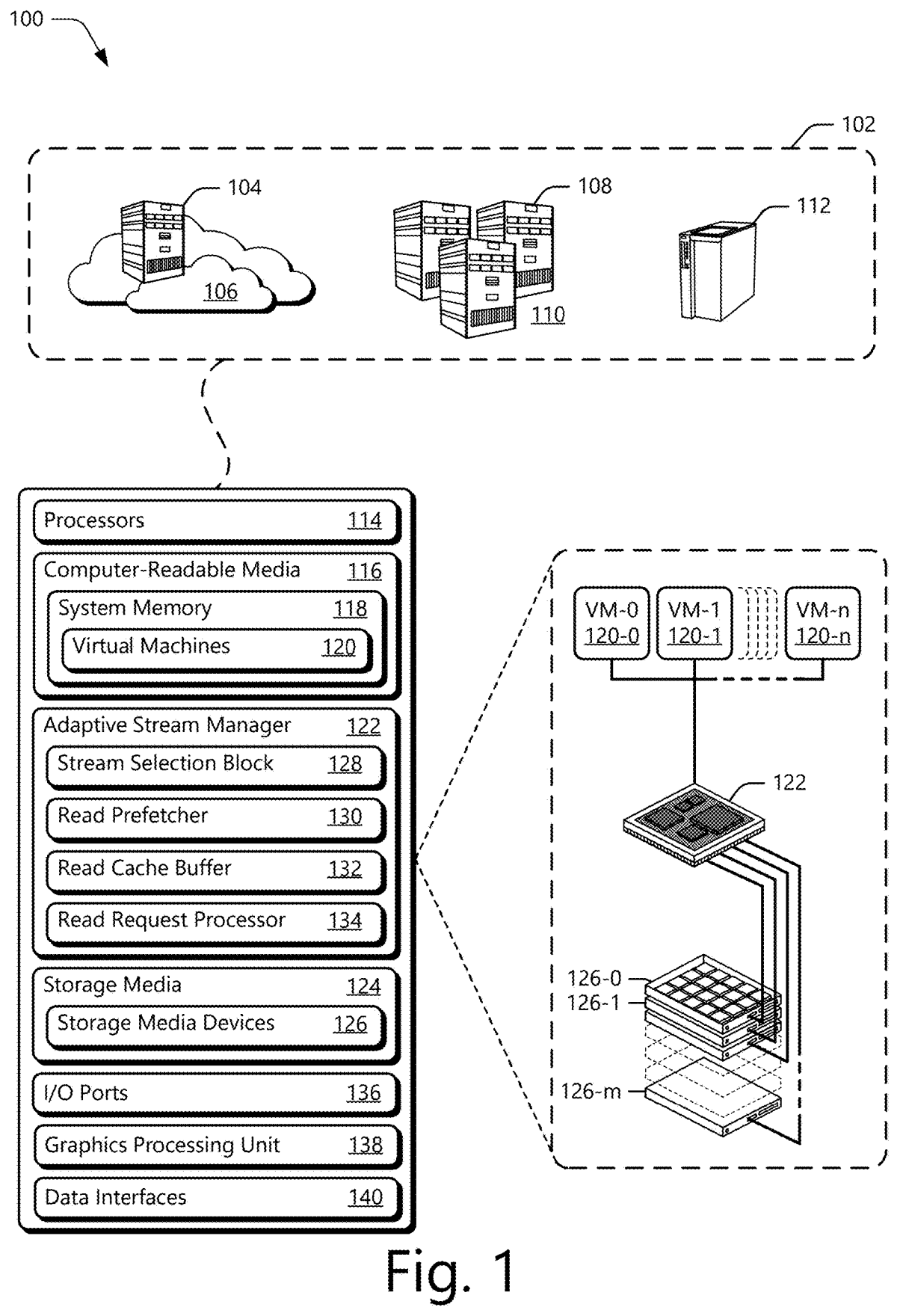

100 ⟍

102

104

106

108

110

112

| Processors | 114 |

| Computer-Readable Media | 116 |

| System Memory | 118 |

| Virtual Machines | 120 |

| Adaptive Stream Manager | 122 |

| Stream Selection Block | 128 |

| Read Prefetcher | 130 |

| Read Cache Buffer | 132 |

| Read Request Processor | 134 |

| Storage Media | 124 |

| Storage Media Devices | 126 |

| I/O Ports | 136 |

| Graphics Processing Unit | 138 |

| Data Interfaces | 140 |

| VM-0 120-0 | VM-1 120-1 | VM-n 120-n |

200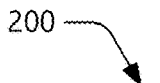

| Host   202 |
|---|
| Compute Resources   204 |

Virtual Machines   120

| VM-0 120-0 | VM-1 120-1 | VM-2 120-2 | VM-3 120-3 | . . . . . | VM-n 120-n |
|---|---|---|---|---|---|

Adaptive Stream Controller   122

| Stream Selection Block 128 | Read Prefetcher 130 | Read Cache Buffer 132 | Read Request Processer 134 |
|---|---|---|---|

Storage Controller   206

SSD Controller   208-0

| NAND | NAND |
|---|---|
| NAND | NAND |
| NAND | NAND |
| NAND | NAND |

Channel A 210-1    Channel D 210-4

Solid-State Drive   126-0

SSD Controller   208-n

| NAND | NAND |
|---|---|
| NAND | NAND |
| NAND | NAND |
| NAND | NAND |

Channel A 210-1    Channel D 210-4

Solid-State Drive   126-n

Host   302

Compute Resources   304

Virtual Machines   120

| VM-0 120-0 | VM-1 120-1 | VM-2 120-2 | VM-3 120-3 | . . . . . | VM-n 120-n |

Adaptive Stream Controller   122

| Stream Selection Block 128 | Read Prefetcher 130 | Read Cache Buffer 132 | Read Request Processer 134 |

Memory Controller   306

Memory Endpoint   310-0

| DDR | DDR |
| DDR | DDR |
| DDR | DDR |
| DDR | DDR |

Channel A 312-1    Channel D 312-4

Memory Module   308-0

Memory Endpoint   310-n

| DDR | DDR |
| DDR | DDR |
| DDR | DDR |
| DDR | DDR |

Channel A 312-1    Channel D 312-4

Memory Module   308-n

400

800

| Device Stream Tracker Table 702 | |
|---|---|
| Stream ID 708 | Parameters 710 |
| 1 | Status, Start Rd Addr, Host ID, TC, Stream Priority |
| 2 | Status, Start Rd Addr, Host ID, TC, Stream Priority |
| ... | |
| N | Status, Start Rd Addr, Host ID, TC, Stream Priority |

| Buffer Tracker Table 704 | |
|---|---|
| Stream ID 708 | Parameters 712 |
| 1 | Page State [ ], Active Req, Rd Addr |
| 2 | Page State [ ], Active Req, Rd Addr |
| ... | |
| N | Page State [ ], Active Req, Rd Addr |

1000

1100

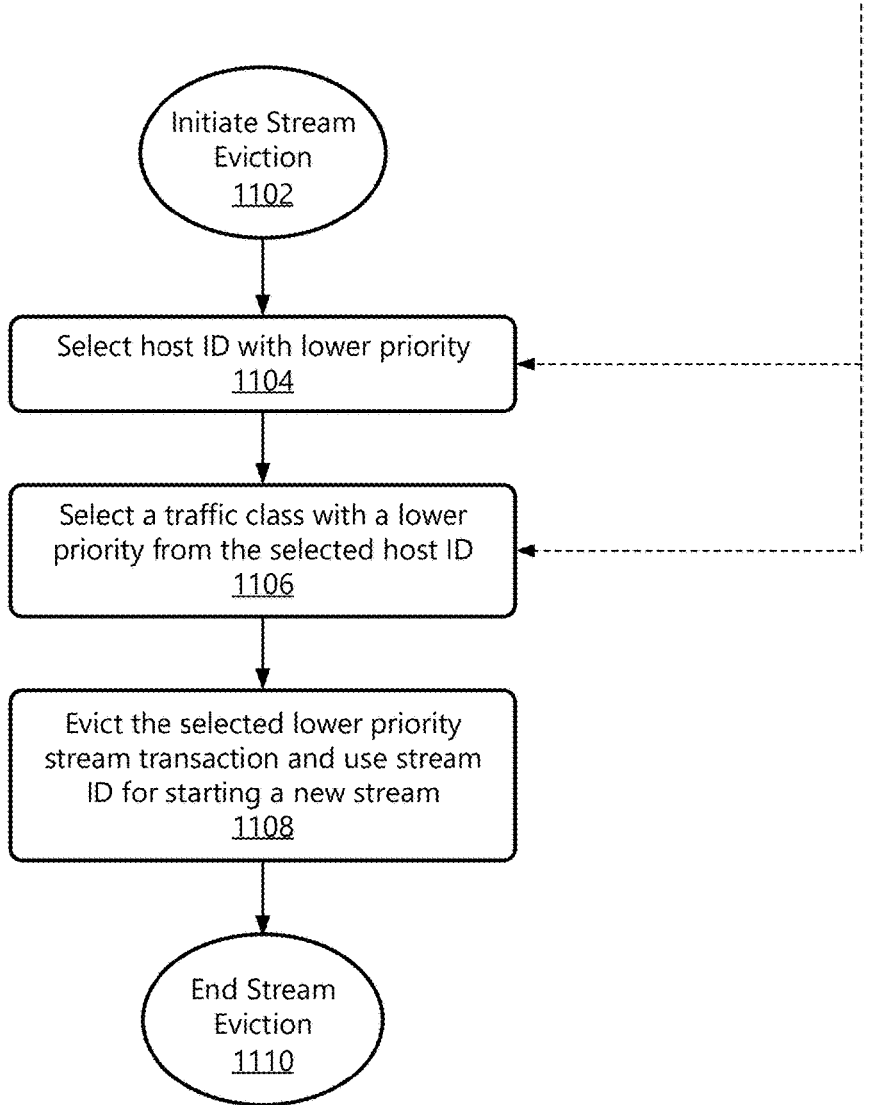

| Device Stream Tracker Table   70x | |
| --- | --- |
| Device Stream ID 70x | Parameters 70x |
| 1 | Status, Start Rd Addr, Host ID, TC, Priority |
| 2 | Status, Start Rd Addr, Host ID, TC, Priority |
| ... | |
| N | Status, Start Rd Addr, Host ID, TC, Priority |

Initiate Stream
Eviction
1102

Select host ID with lower priority
1104

Select a traffic class with a lower
priority from the selected host ID
1106

Evict the selected lower priority
stream transaction and use stream
ID for starting a new stream
1108

End Stream
Eviction
1110

Data Read Request   1202

Stream Control Field
1204

| Field | Width (bits) | | |
|---|---|---|---|
| | 68b Flit | 256b Flit | PBR Flit |
| Valid | 1 | | |
| MemOpcode | 4 | | |
| SnpType | 3 | | |
| MetaField | 2 | | |
| MetaValue | 2 | | |
| Tag | 16 | | |
| Address[5] | 1 | 0 | |
| Address[51:6] | 46 | | |
| LD-ID[0:3] | 4 | | 0 |
| SPID | 0 | | 12 |
| DPID | 0 | | 12 |
| Stream Control Bits | 6 | 20 | |
| Traffic Class | 2 | | |
| Total | 87 | 100 | 120 |

1206

}1204

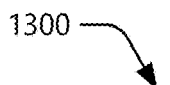

1300

Receive a read request from a host with
an indication for a stream transaction
1302

Determine a priority level for the stream transaction of the host
based on an identifier of the host and a traffic class of the read request
1304

Allocate a stream transaction identifier to the host for the read
request based on the priority level of the stream transaction
1306

Initiate the stream transaction to prefetch at least a portion of data
that corresponds to the read request to a cache of the controller
1308

Fig. 13

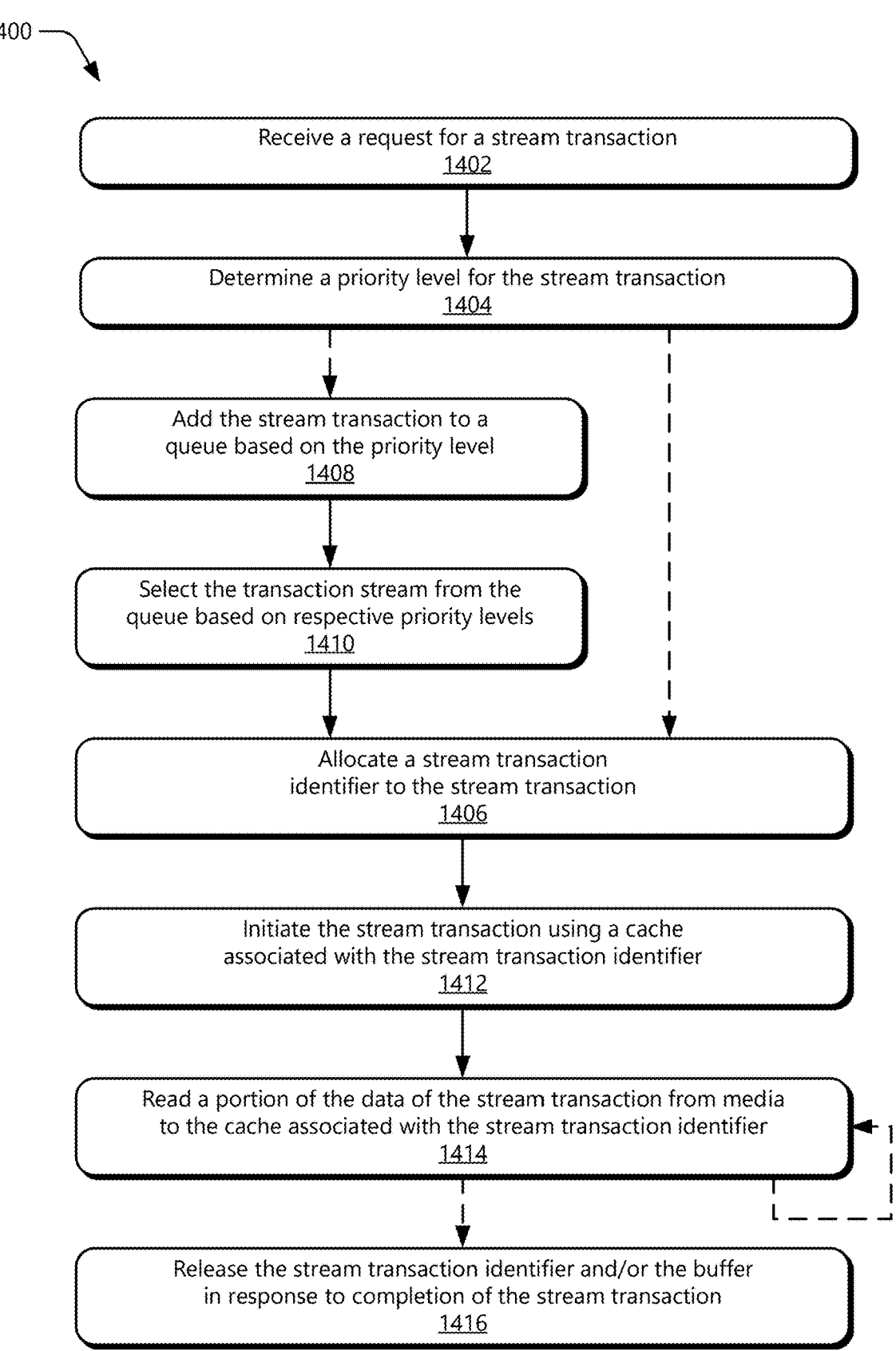

1400

Receive a request for a stream transaction
1402

Determine a priority level for the stream transaction
1404

Add the stream transaction to a
queue based on the priority level
1408

Select the transaction stream from the
queue based on respective priority levels
1410

Allocate a stream transaction
identifier to the stream transaction
1406

Initiate the stream transaction using a cache
associated with the stream transaction identifier
1412

Read a portion of the data of the stream transaction from media
to the cache associated with the stream transaction identifier
1414

Release the stream transaction identifier and/or the buffer
in response to completion of the stream transaction
1416

Fig. 14

1500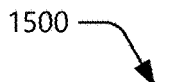

Initiate one or more stream transactions over an interface
1502

Determine bandwidth utilization of the interface by the one
or more stream transactions and other media access activity
1504

Compare the bandwidth utilization of the interface to a threshold
1506

Pause one of the
stream transactions
1508

Evict one of the
stream transactions
1510

Restart at least one of the stream transactions
1512

Fig. 15

ADAPTIVE STREAM MANAGEMENT

CROSS REFERENCE TO RELATED APPLICATION

This present disclosure claims priority to U.S. Provisional Patent Application Ser. No. 63/417,686 filed Oct. 19, 2023, the disclosure of which is incorporated by reference herein in its entirety.

BACKGROUND

Many computing and electronic devices include storage media for storing software, applications, or data of the device. Additionally, most users stream data or access services with their devices, such as multimedia content or social media applications, over data networks from various locations or on the move. With users' ever-increasing demand for data and services, storage providers have scaled up capacity and performance of storage drives to support the data access associated with these activities of users and other data storage clients. Typically, a storage drive of a device includes storage media to which data of the device is written and read from. To do so, the device may issue data access requests to a controller of the storage media, which in turn writes the data to or reads the data from the storage media as specified by each request. Thus, storage performance of a device generally depends on a rate at which the storage controller is able to complete the data access requests of the device or the storage client.

Generally, a storage controller is designed to process different types of data read and write access requests as quickly as possible. Access patterns of the storage media, however, can vary over a wide array of user, host, or application usage patterns. As such, a conventional storage controller may not be optimized for access request traffic patterns or flows associated with different applications, user types, multitasking, storage network topologies, and so forth. Additionally, some types of predictive read requests attempt to prefetch data that may or may not be used by a host, which increases controller overhead and creates contention for storage cache resources as prefetched data consumes cache space. Thus, a storage controller handling a large volume of predictive read requests, may be overloaded by an increase in random read requests or bursts of other access requests. This combination of access requests can create a bottleneck in request handling that forces the controller to drop the predictive read requests to free up resources to process the other access requests, resulting in suboptimal storage performance because the controller is unable to concurrently handle the different types of access requests.

SUMMARY

This summary is provided to introduce subject matter that is further described in the Detailed Description and Drawings. Accordingly, this Summary should not be considered to describe essential features nor used to limit the scope of the claimed subject matter.

In some aspects, a media controller implements a method for adaptive stream management by receiving, from a host, a read request with an indication for a stream transaction of multiple reads of respective data from media operably coupled to the media controller. The method includes determining a priority level for the stream transaction of the host based on an identifier of the host and a quality-of-service indicator of the read request and allocating a stream transaction identifier to the host for the read request based on the priority level of the stream transaction. The media controller can then initiate the stream transaction to prefetch, from the media coupled to the controller, the respective data of at least one of the multiple reads to a cache of the media controller as part of stream transaction.

In other aspects, an apparatus includes media configured to store data, a media controller that includes a cache and is configured to enable access to the data stored by the media, a host interface configured to communicate with one or more hosts, and an adaptive stream manager. The adaptive stream manager is configured to receive, from a host, a read request with an indication for a stream transaction of multiple reads of respective data from the media. The adaptive stream manager determines a priority level for the stream transaction of the host based on an identifier of the host and a quality-of-service indicator of the read request and allocates a stream transaction identifier to the host for the read request based on the priority level of the stream transaction. The stream transaction is then initiated to prefetch, from the media, the respective data of at least one of the multiple reads to the cache of the media controller as part of the stream transaction.

In yet other aspects, a System-on-Chip includes a media controller with a cache and that is configured to enable access to media operably coupled to the media controller, a host interface configured to communicate with one or more hosts, and an adaptive stream manager. The adaptive stream manager is configured to receive, from a host, a read request with an indication for a stream transaction of multiple reads of respective data from the media operably coupled to the media controller. The adaptive stream manager determines a priority level for the stream transaction of the host based on an identifier of the host and a quality-of-service indicator of the read request and allocates a stream transaction identifier to the host for the read request based on the priority level of the stream transaction. The stream transaction is then initiated to prefetch, from the media, the respective data of at least one of the multiple reads to the cache of the media controller as part of the stream transaction.

The details of one or more aspects of adaptive stream management are set forth in the accompanying drawings and the following description. Other features and advantages will be apparent from the description and drawings, and from the claims.

BRIEF DESCRIPTION OF THE DRAWINGS

The details of one or more aspects of adaptive stream management are set forth in the accompanying figures and the detailed description below. In the figures, the left-most digit of a reference number identifies the figure in which the reference number first appears. The use of the same reference numbers in different instances in the description and the figures may indicate like elements:

FIG. 1 illustrates an example operating environment having systems in which aspects of adaptive stream management can be implemented;

FIG. 2 illustrates an example storage system with an adaptive stream manager implemented in accordance with one or more aspects;

FIG. 11 depicts an example flow chart for managing host and traffic class priority in accordance with one or more aspects;

FIG. 13 depicts an example method for adaptive stream management in accordance with one or more aspects;

FIG. 14 depicts an example method for allocation of stream transaction requests in accordance with one or more aspects;

FIG. 15 depicts an example method for managing stream transactions to balance bandwidth utilization in accordance with one or more aspects;

DETAILED DESCRIPTION

Figure 3:
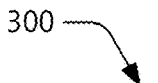
FIG. 3 illustrates an example memory system with an adaptive stream manager implemented in accordance with one or more aspects.

Generally, a media controller is designed to process different types of data read and write access requests as quickly as possible. Access patterns of the media, however, can vary over a wide array of user, host, or application usage patterns. As such, a conventional media controller may not be optimized for access request traffic patterns or flows associated with different applications, user types, hosts sharing memory, multitasking, storage network topologies, and so forth. Additionally, some types of predictive read requests attempt to prefetch data that may or may not be used by a host, which increases controller overhead and creates contention for cache resources as prefetched data consumes cache space. Thus, a media controller handling a large volume of predictive read requests, may be overloaded by an increase in random read requests or bursts of other access requests. This combination of access requests can create a bottleneck in request handling that forces the controller to drop the predictive read requests to free up resources to process the other access requests, resulting in suboptimal media access performance because the media controller is unable to concurrently handle the different types of access requests.

By way of example, many compute express link (CXL) memory devices have low latency requirements, particularly for read operations. Additionally, some of these memory devices also support a speculative memory read in which a memory controller may prefetch additional data of a sequential read that is requested by a host. As such, processing the speculative read requests can consume additional bandwidth on the bus side and device side of a memory interconnect, as well as occupying cache space of the controller until the speculative reads are complete. When the interconnect becomes loaded, such as by an influx of random read requests, the memory controller is typically forced to drop data and control transactions of the speculative read requests due to the high bandwidth costs associated with speculative read operations. Because these requests have no associated priority or progress tracking information, memory controllers arbitrarily drop the data and control information associated with the speculative read operations when bandwidth of the memory interconnect becomes constrained. Thus, the arbitrary drops of in process speculative reads can result in loss of valuable interface bandwidth associated with performance of these reads. Additionally, the cache of the controller can be subject to indirect management by multiple hosts, which are unaware of request types or interconnect utilization by the other hosts. As the number of hosts increases, managing cache usage for processing the respective requests of the multiple hosts becomes more difficult. Accordingly, preceding techniques for managing bandwidth or cache associated with speculative reads often resulted in the arbitrary dropping of read requests or data evictions from cache, which in turn increase latency and impair memory performance.

This disclosure describes apparatuses and techniques for adaptive stream management. In contrast with preceding techniques of managing memory access, the described apparatuses and techniques may implement aspects of adaptive stream management for prioritizing, allocating, and/or managing stream transactions of multiple or sequential data reads, which may reduce read latency, improve cache usage efficiency, and reduce host-bus traffic. In various aspects of adaptive stream management, a command syntax for read requests may be modified to add or define a field related to handling sequential streams or stream transactions that may enable a media controller to initiate data prefetch without introducing delay or reducing latency. In some implementations, the prioritization provided by the described aspects allows for following a quality-of-service (QoS) level or traffic class associated with a read access request and provide differentiated service to a corresponding host, service, or application. Alternatively or additionally, utilization and management of a media controller cache may also be improved or optimized among multiple hosts as the adaptive stream manager can determine or assign priority for data prefetch operations or stream transactions. Further, the adaptive stream manager may be implemented with a load balancing component to monitor and handle random request traffic to maintain overall QoS of the media access system. These and other features of adaptive stream management, which are described throughout this disclosure, May prioritize, allocate, and manage stream transactions for media access, which may decrease bandwidth overhead associated with prefetch or streaming operations and effectively utilize cache memory based on prioritized access and usage.

In various aspects, an adaptive stream manager of a media controller receives a read request from a host with an indication for a stream transaction of multiple reads of data from media coupled to the media controller. The adaptive stream manager determines a priority level for the stream transaction based on an identifier of the host and a quality-of-service indicator of the read request. The adaptive stream manager can allocate a stream identifier (stream transaction identifier) to the host for the read request based on the priority level determined. Alternatively, the adaptive stream manager may decline to allocate a stream transaction identifier to the host for the read request and may instead place the read request on a wait list until an identifier becomes available or a higher priority stream transaction is completed. The adaptive stream manager can initiate the stream transaction to prefetch, from the media, respective data of at least one of the multiple reads to a cache of the media controller as part of the stream transaction. By so doing, aspects of adaptive stream management can prioritize stream transactions among hosts to efficiently manage resources of the controller and improve processing of stream transactions and other types of data access requests.

The following discussion describes an operating environment, configurations, techniques that may be employed in the operating environment, a System-on-Chip (SoC), and various media controllers in which components of the operating environment may be embodied. In the context of the present disclosure, reference is made to the operating environment, techniques, or various components by way of example only.

Operating Environment

FIG. 1 illustrates an example operating environment 100 having host systems 102 (referred to as a single "host system 102") in which adaptive stream management may be implemented in accordance with one or more aspects. Generally, the host systems are capable of communicating, storing, or accessing various forms of data or information. Examples of the host system 102 may include a computing cluster 104 (e.g., of a cloud 106), a server 108 or server hardware of a data center 110, or a server 112 (e.g., standalone), any of which may be configured as part of a storage network, data storage center, or cloud system. Further examples of host system 102 (not shown) may include a laptop computer, tablet computer, desktop computer, a set-top-box, a data storage appliance, wearable smart-device, television, content-streaming device, high-definition multimedia interface (HDMI) media stick, smart appliance, home automation controller, smart thermostat, Internet-of-Things (IoT) device, mobile-internet device (MID), a network-attached-storage (NAS) drive, aggregate storage system, aggregate memory system, memory expander, gaming console, automotive entertainment device, automotive computing system, automotive control module (e.g., engine or power train control module), and so on. Generally, a host system 102 may communicate or store data for any suitable purpose, such as to enable functionalities of a particular type of device, provide a user interface, enable network access, implement gaming applications, playback media, provide navigation, edit content, provide data storage, or the like.

The host system 102 includes processors 114 and computer-readable storage media 116. The processors 114 may be implemented as any suitable type or number of processors (e.g., x86 or ARM), either single-core or multi-core, for executing instructions or commands of an operating system or other programs of the host system 102. The computer-readable media 116 (CRM 116) includes system memory 118 from which virtual machines 120 of a host may be executed or implemented. The system memory 118 of the host system 102 may include any suitable type or combination of volatile memory or nonvolatile memory. For example, the volatile memory of host systems 102 may include various types of random-access memory (RAM), dynamic RAM (DRAM), static RAM (SRAM) or the like. The non-volatile memory may include read-only memory (ROM), electronically erasable programmable ROM (EE-PROM) or Flash memory (e.g., NOR Flash or NAND Flash). These memories, individually or in combination, may store data associated with applications, tenants, workloads, initiators, virtual machines, and/or an operating system of the host system 102.

In this example, the host system 102 includes an adaptive stream manager 122 and storage media 124, which may be accessed through the adaptive stream manager 122 or storage controller on which the adaptive stream manager is embodied. Although shown as being combined with the host system 102, the adaptive stream manager 122 and/or the storage media 124 may be implemented separately from or remotely from the host system 102. Alternatively, the adaptive stream manager 122 may be implemented in association with memory media (e.g., memory expander or memory aggregator) as described herein. The storage media 124 of the host system 102 may be configured as any suitable type of data storage media, such as a storage device, storage drive, storage array, storage volume, or the like. Although described with reference to the host system 102, the storage media 124 may also be implemented separately as a stand-alone device or as part of a larger storage collective, such as a data center, server farm, or virtualized storage system (e.g., for cloud-based storage or services). Examples of the storage media 124 include a hard-disk drive (HDD, not shown), an optical-disk drive (not shown), a solid-state drive 126 (SSD 126) or array of m+1 SSDs 126-0 through 126-m.

In this example, each of the SSDs 126 includes or is formed from non-volatile memory devices on which data or information of the host system 102 or other sources is stored. The non-volatile memory devices may be implemented with any type or combination of solid-state memory media, such Flash, NAND Flash, NAND memory, RAM, DRAM (e.g., for caching), SRAM, or the like. In some cases, the data stored to the non-volatile memory devices may be organized into files of data (e.g., content) or data objects that are stored to the SSDs 126 and accessed by the host system 102 or tenants, workloads, or initiators of the host system. The types, sizes, or formats of the files may vary depending on a respective source, use, or application associated with the file. For example, the files stored to the SSDs 126 may include audio files, video files, text files, image files, multimedia files, spreadsheets, and so on.

In this example, the adaptive stream manager 122 of the host system 102 may enable and manage access of the storage media 124 by the host system 102 and/or hosts, tenants, or workloads thereof. For example, the adaptive stream manager 122 may receive read requests for sequential reads, stream transactions, or speculative reads of data from the storage media 124. Generally, the adaptive stream manager 122 can prioritize, execute, and/or manager the read requests for stream transactions in accordance with the aspects described herein, which may improve bandwidth and cache utilization of the storage system or a memory system. In some aspects, the adaptive stream manager 122 includes a stream selection block 128, a read prefetcher 130, a read cache buffer 132, and a read request processor 134, each of which may be implemented to perform respective operations or functions for enabling or supporting adaptive stream management. The implementations and uses of these entities vary and are described throughout this disclosure.

Generally, the adaptive stream manager 122 or components thereof may receive commands or requests from one or more host systems 102 for stream transactions to read from the storage media 124 or memory media (not shown). In various aspects, the adaptive stream manager 122 determines a priority for a stream transaction and may allocate a stream transaction identifier based on the priority of the stream transaction relative respective priorities of other stream transactions that are in process or queued for execution by the adaptive stream manager. Alternatively or additionally, the adaptive stream manager 122 may monitor bandwidth utilization of host-side and/or bus-side media interfaces and selectively pause or cease a stream transaction based on priority due to bandwidth constraints to enable a media controller to execute other access requests (e.g., random read requests). By so doing, the adaptive stream manager may reduce latency, improve media access performance, and avoid arbitrarily dropping higher priority stream transactions to increase media controller efficiency. These are but a few examples of adaptive stream management, which are described in detail throughout the disclosure.

The host system 102 may also include I/O ports 136, a graphics processing unit 138 (GPU), and data interfaces 140. Generally, the I/O ports 136 allow a host system 102 to interact with other devices, peripherals, or users. For example, the I/O ports 136 may include or be coupled with a universal serial bus, human interface devices, audio inputs, audio outputs, or the like. The GPU 138 processes and renders graphics-related data for host system 102, such as user interface elements of an operating system, applications, or the like. In some cases, the GPU 138 accesses a portion of local memory to render graphics or includes dedicated memory for rendering graphics (e.g., video RAM) of the host system 102.

The data interfaces 140 of the host system 102 provide connectivity to one or more networks and other devices connected to those networks. The data interfaces 140 may include wired interfaces, such as Ethernet or fiber optic interfaces for communicated over a local network, intranet, or the Internet. Alternately or additionally, the data interfaces 140 may include wireless interfaces that facilitate communication over wireless networks, such as wireless LANs, wide-area wireless networks (e.g., cellular networks), and/or wireless personal-area-networks (WPANs). Any of the data communicated through the I/O ports 136 or the data interfaces 140 may be written to or read from the storage media 124 of the host system 102 in accordance with one or more aspects of this disclosure.

The data interfaces 140 may support a host interface of the adaptive stream manager 122 and a media interface of the adaptive stream manager 122. For example, the adaptive stream manager 122 may receive host commands and respond to host commands from the host interface. The adaptive stream manager 122 may direct transactions over the media interface to cause the storage media 124 or memory devices to execute the host commands. In aspects, the adaptive stream manager 122 may allocate and manage read requests for stream transactions issued by one or more hosts for data of the storage media 124 or memory media coupled to the host system via the data interfaces 140.

FIG. 2 illustrates at 200 an example storage system with an adaptive stream manager implemented in accordance with one or more aspects. The storage system 200 may represent an example configuration of the adaptive stream manager 122 and storage media 124 as described with reference to FIG. 1. A host 202 and compute resources 204 may be implemented similarly to or differently the host 102 and processors 114 of FIG. 1 and may represent a single host executing on a processor, several hosts executing on respective processors, multiple hosts executing on a pool of processing resources, and so forth. In this example, the adaptive stream manager 122 implemented as part of a storage controller 206, which is operably coupled between the host 202 and SSDs 126-0 through 126-$n$ (collectively "SSDs 126") from which areas, partitions, or segments of storage are provided. The adaptive stream manager 122 and storage controller 206 may be coupled to the host 202 and/or the SSDs through one or more respective PCIe interfaces (not shown) that may communicate in compliance with an NVMe protocol (e.g., NVMe rev 1.3). The host 202 (e.g., a host device 102) may include multiple virtual machines 120-0 through 120-$n$ that execute on the compute resources 204 of the host. Generally, the compute resources 204 of the host 202 may include combinations of processing resources and system memory of the host 202 which are used to implement the applications, virtual machines, tenants, or initiators that access memory or storage associated with the host 202. As such, although shown as a singular host, the host 202 may represent multiple hosts, applications, virtual machines, guests, tenants, and/or initiators that can issue commands or requests to access the data storage provided by the SSDs 126.

Generally, tenants or initiators of the VMs 120, or the host 202, access data stored in the SSDs 126. In some implementations, the storage controller 206 presents aggregated storage media, such as SSDs 126, as a virtual disk or storage volume to the host 202 or the VMs 120 of the host. For example, in the context of NVMe, a virtual disk may be segmented or partitioned into different areas that are accessed through a namespace. In aspects, the host 202 or tenants of the host issue access commands or requests to the storage controller 206 to write data to or read data from the storage presented by the storage controller 206. These commands or requests may be received and processed by the storage controller 206 and the adaptive stream manager 122, which may issue corresponding command or requests to controllers 208 of the SSDs 126 to implement the data write or read operations from the storage media. In this example, each of the SSDs 126 may be implemented with an SSD controller 208-0 through 208-$n$ through which NAND channels 210-1 through 210-4 are accessible. Each channel 210 of NAND (e.g., channel A or NAND channel 210) includes multiple NAND devices, which may be implemented as separate NAND devices or NAND dies of the SSD 126 that are accessible or addressable through a respective NAND channel for data storage.

In aspects, the tenants or initiators of the VMs 120 (or hosts) may issue read requests to the storage controller 206 that include read requests for stream transactions, which may include a read command or request configured to execute multiple reads of respective data from the storage media operably coupled to the storage controller 206. For example, the host 202 may issue a read request to the storage controller 206 for a stream transaction where the read request includes one of a sequential read, a speculative read, a predictive read, a stream read, or the like. In other words, in aspects of adaptive stream management, the host may issue configure or issue a read command with the indicators described herein such that a sequential read, a speculative read, a predictive read, or a stream read may be handled or treated as a normal read command with different parameters or indicators (e.g., stream indicators). As described herein, the read request may be configured with an indication for a streaming transaction, as well as other stream related indicators for the request as being a stream start, a stream end, or a length or size of the stream transaction. In aspects, the adaptive stream manager 122 may interact with the storage controller 206 to manage the processing of read requests related to stream transactions, which may include receiving the read requests, determining respective priority levels for the read requests, allocating stream transaction identifiers for the stream requests, and/or other operations implemented in accordance with adaptive stream management.

As another example, consider FIG. 3 which illustrates at 300 an example memory system with an adaptive stream manager implemented in accordance with one or more aspects. The memory system 300 may represent an alternative or additional configuration of the adaptive stream manager 122 as described with reference to FIG. 1. In this example, a host 302 and compute resources 304 may be implemented similarly to or differently the host 102 and processors 114 of FIG. 1 and may represent a single host executing on a processor, several hosts executing on respective processors, multiple hosts executing on a pool of processing resources, and so forth. The adaptive stream manager 122 may be implemented as part of a memory controller 306, which is operably coupled between the host 302 and memory modules 308-0 through 308-n (collectively "memory modules 308") from which areas, partitions, or segments of memory are provided. The adaptive stream manager 122 and memory controller 306 may be coupled to the host 302 and/or the memory modules through one or more respective PCIe interfaces (not shown) that may communicate in compliance with a CXL protocol. The host 302 (e.g., a host device 102) may include multiple virtual machines 120-0 through 120-n that execute on the compute resources 304 of the host. Generally, the compute resources 304 of the host 302 may include combinations of processing resources and system memory of the host 302 which are used to implement the applications, virtual machines, tenants, or initiators that access memory or memory associated with the host 302. As such, although shown as a singular host, the host 302 may represent multiple hosts, applications, virtual machines, guests, tenants, and/or initiators that can issue commands or requests to access the data memory provided by the memory modules 308 (or memory devices).

Generally, tenants or initiators of the VMs 120, or the host 302, access data stored in the memory coupled to the memory controller 306. In some implementations, the memory controller 306 presents aggregated memory media, such as memory modules 308, as aggregate or pooled memory to the host 302 or the VMs 120 of the host. For example, in the context of CXL, multiple DRAM modules (e.g., DDR4, DDR5, DDR6) or devices may be pooled or coupled to a memory endpoint 310 to provide memory areas accessible by one or more hosts (e.g., dedicated or shared memory areas). In aspects, the host 302 or tenants of the host issue access commands or requests to the memory controller 306 to write data to or read data from the memory accessible through the memory controller 306. These commands or requests may be received and processed by the memory controller 306 and the adaptive stream manager 122, which may issue corresponding command or requests to memory endpoints 310 of the memory modules 308 to implement the data write or read operations from the memory media. In this example, each of the memory modules 308 may be implemented with a memory endpoint 310-0 through 310-n through which DRAM channels 312-1 through 312-4 are accessible. Each channel 312 of DRAM (e.g., channel A or DRAM channel 312) includes multiple DRAM devices, which may be implemented as separate DRAM devices or DRAM dies of the memory module 308 that are accessible or addressable through a respective DRAM channel for data memory.

In aspects, the tenants or initiators of the VMs 120 (or hosts) may issue read requests to the memory controller 306 that include read requests for stream transactions, which may include a read command or request configured to execute multiple reads of respective data from the memory media operably coupled to the memory controller 306. For example, the host 302 may issue a read request to the memory controller 306 for a stream transaction where the read request includes one of a sequential read, a speculative read, a predictive read, a stream read, or the like. In other words, in aspects of adaptive stream management, the host may issue configure or issue a read command with the indicators described herein such that a sequential read, a speculative read, a predictive read, a stream read, or similar multi-read command may be handled or treated as a normal read command with different parameters or indicators (e.g., stream indicators). As described herein, the read request may be configured with an indication for a streaming transaction, as well as other stream related indicators for the request as being a stream start, a stream end, or a length or size of the stream transaction. In aspects, the adaptive stream manager 122 may interact with the memory controller 306 to manage the processing of read requests related to stream transactions, which may include receiving the read requests, determining respective priority levels for the read requests, allocating stream transaction identifiers for the stream requests, and/or other operations implemented in accordance with adaptive stream management.

Figure 4:
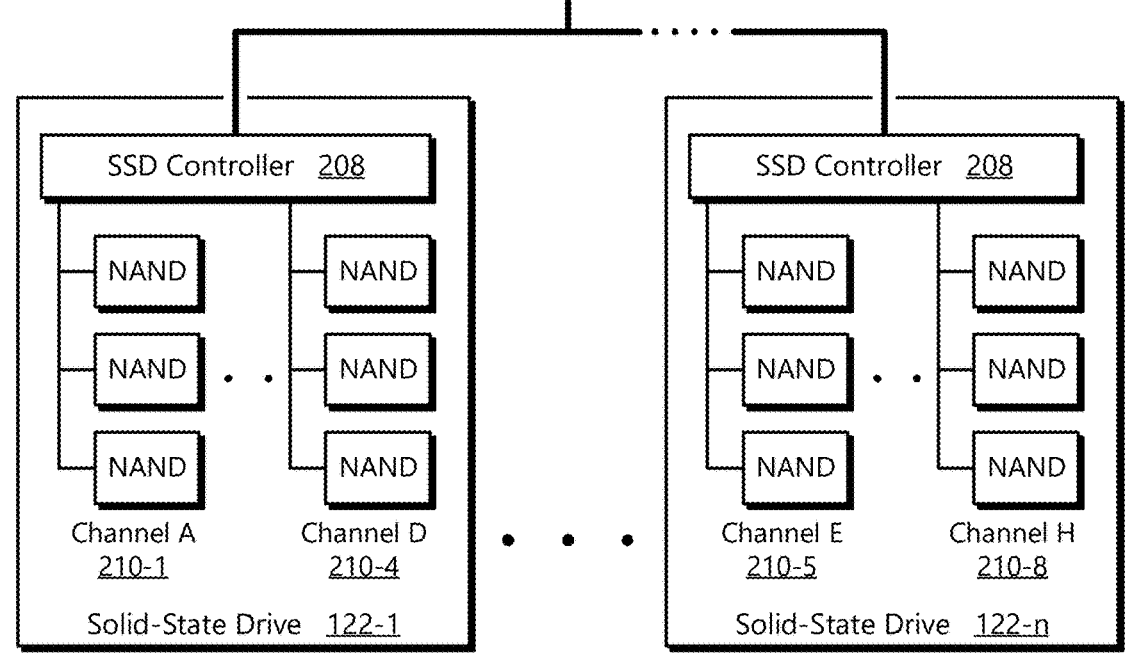
FIG. 4 illustrates an example Fabric-enabled media accelerator with an adaptive stream manager implemented in accordance with one or more aspects.

FIG. 4 illustrates at 400 an example Fabric-enabled media accelerator with an adaptive stream manager implemented in accordance with one or more aspects. In this example, the Fabric-enabled media accelerator 402 (accelerator 402) includes an instance of an adaptive stream manager 122, a Fabric interface 404 and is operably coupled between an instance of a Fabric 406 (e.g., Fabric interconnect) and an array of SSDs 122-1 through 122-n. The Fabric interface 404 may include an NVM over Fabric (NVM-OF) interface, such as a Non-Volatile Memory Express (NVMe) over Ethernet, InfiniBand, or Fibre Channel (FC) interface. As such, the accelerator 402 may be implemented as a Fabric-enabled storage target in a disaggregated storage system.

Through the Fabric 406, any of the multiple host devices 102-1 though 102-m may access the SSD 126 array or a memory array through the accelerator 402. Here, each SSD 126 of the SSD array is implemented with an SSD controller 208 by which four channels 210 of NAND (e.g., A-D or E-H) are accessible. Each channel 210 of NAND (e.g., channel E or NAND channel 210-5) includes multiple NAND devices or NAND dies. In aspects, the accelerator 402 may aggregate or pool any combination of the SSDs 126, NAND channels 210, or NAND devices as a storage area for access by the hosts 102 coupled to the Fabric 406. The hosts 102 or tenants of the hosts can issue access commands or requests to the media accelerator 402 to write data to or read data from the storage presented by the media accelerator 402.

These commands or requests may be received and processed by the media accelerator 402 and the adaptive stream manager 122, which may issue corresponding command or requests to controllers 208 of the SSDs 126 to implement the data write or read operations from the storage media. As described herein, the read request may be configured with an indication for a streaming transaction, as well as other stream related indicators for the request as being a stream start, a stream end, or a length or size of the stream transaction. In aspects, the adaptive stream manager 122 may interact with the media accelerator 402 to manage the processing of read requests related to stream transactions, which may include receiving the read requests, determining respective priority levels for the read requests, allocating stream transaction identifiers for the stream requests, and/or other operations implemented in accordance with adaptive stream management.

Figure 5:
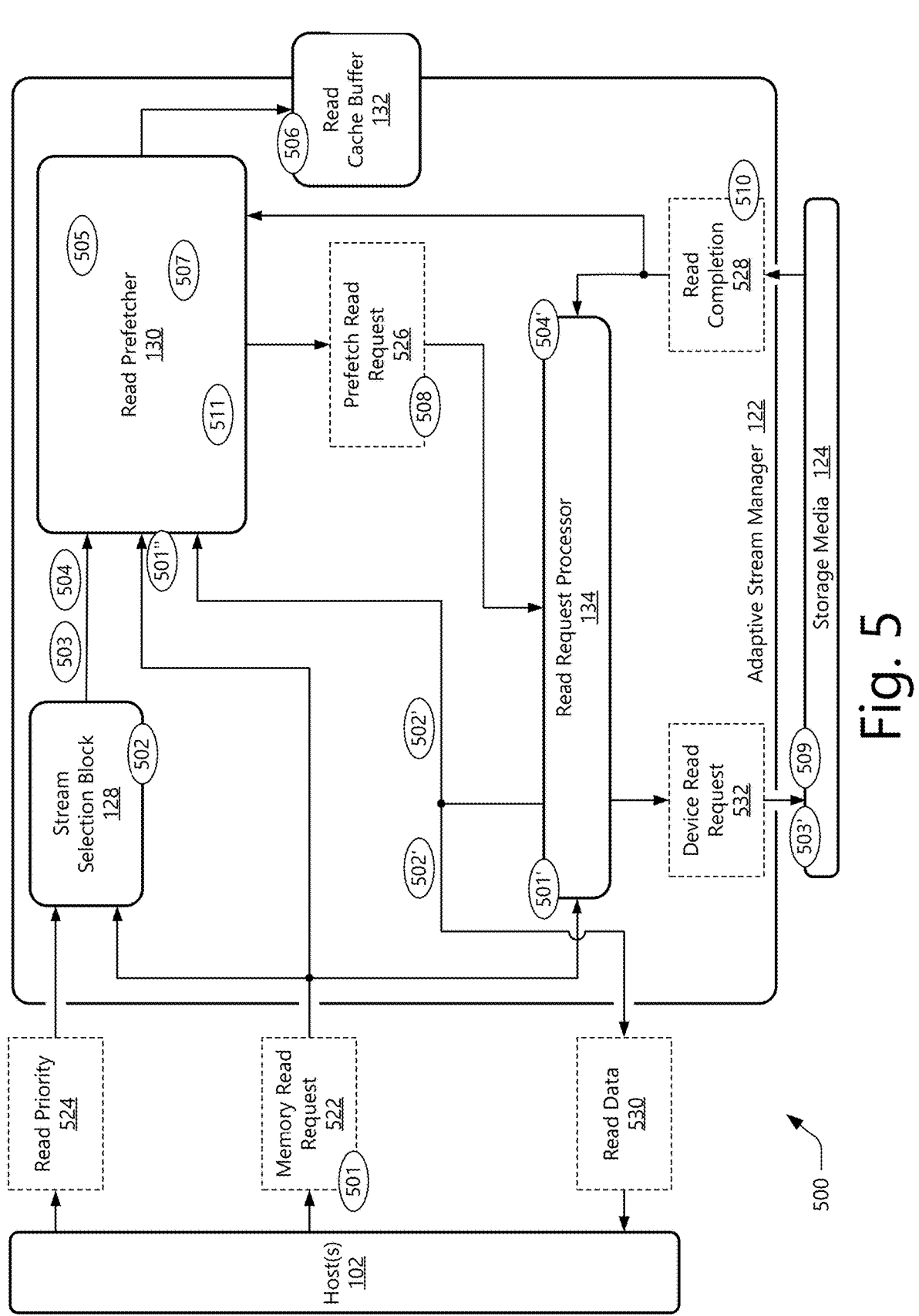
FIG. 5 illustrates an example adaptive stream manager configured in accordance with one or more aspects.

FIG. 5 illustrates at 500 an example adaptive stream manager configured in accordance with various aspects. In this example, an adaptive stream manager 122 is operably coupled with one or more hosts 102 and storage media 124. The adaptive stream manager 122 may be embodied on a storage controller, which includes a host interface and a storage media interface. Alternatively, an adaptive stream manager 122 can be implemented between the hosts 102 and memory media (not shown), and may be embodied on a memory controller that provides a host interface and a memory interface. Generally, the adaptive stream manager 122 can manage the processing and execution of sequential read requests, which may include sequential streams, stream transactions, sequential reads, speculative reads, prefetch reads, or the like.

As shown in FIG. 5, the adaptive stream manager 122 includes a stream selection block 128, read prefetcher 130, read cache buffer 132, and read request processor 134, examples of which are also described with reference to FIGS. 6-9. With reference to components and respective functionalities provided by the adaptive stream manager 122 and various components, description of the adaptive stream manager 122 with reference to FIGS. 5-9 may refer to the operation references 501-512 that appear in relation to the components illustrated in the corresponding figures. As such, FIG. 5 may illustrate an overview of the adaptive stream manager 122, with FIGS. 6-9 presenting details of the components in relation to the example architecture illustrated at 500.

In aspects, the adaptive stream manager 122 can receive, at 501, a memory read request 522 from one of the hosts 102. The memory read request 522 may include an indicator or flag that the read request is configured to implement a stream transaction or a sequential stream read of data from the storage media 124. The adaptive stream manager 122 may provide the memory read request 522 to the stream selection block 128, the read prefetcher 130, and/or the read request processor 134. In some implementations, the memory read request 522 includes the indication of the stream transaction and other information useful to the stream selection block 128 for prioritizing and allocating resources of the adaptive stream manager 122 for implementing a corresponding sequential stream. In aspects, the host 102 may provide read priority information 524 (e.g., read prefetch priority settings) to the stream selection block of the adaptive stream manager 122.

Figure 6:
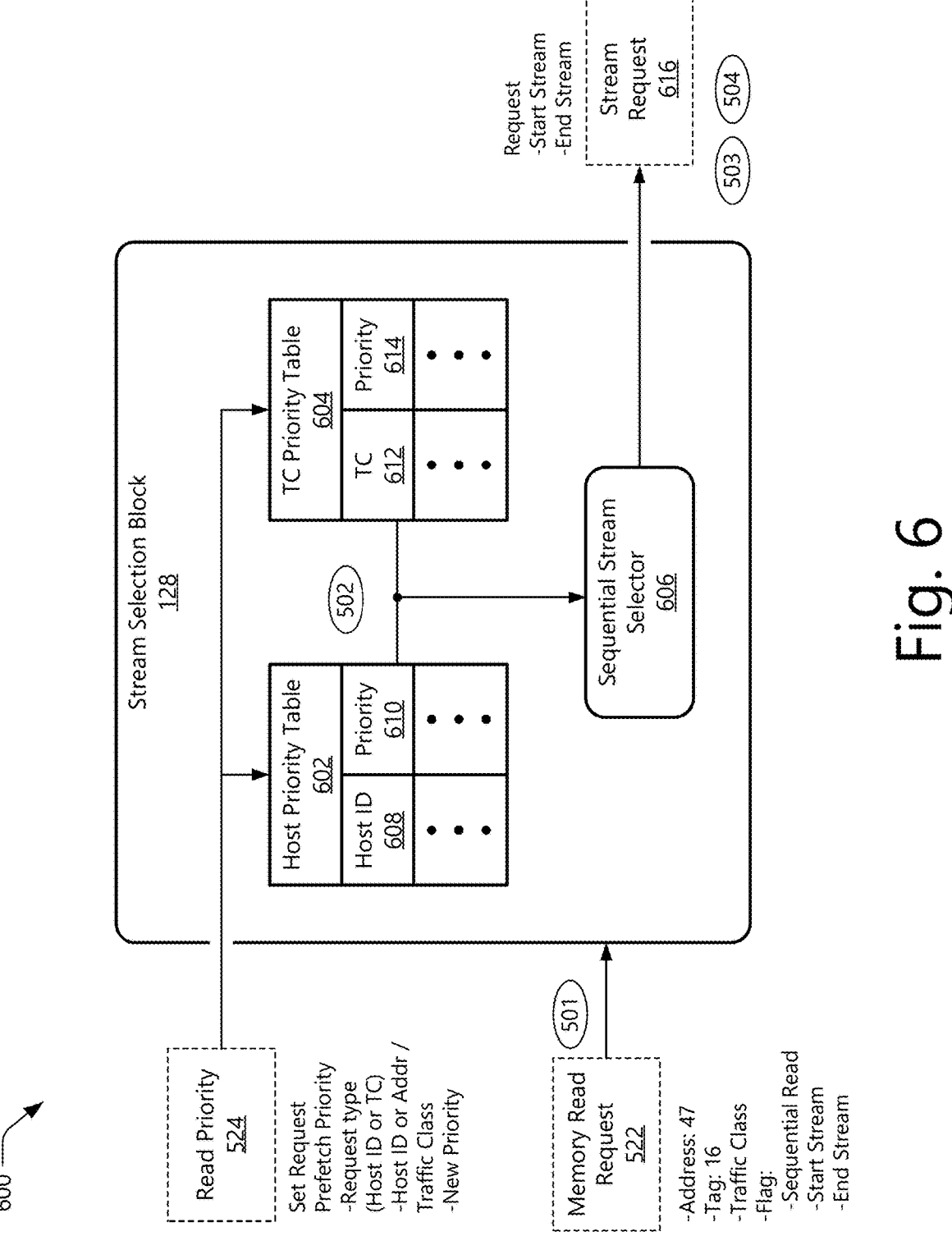
FIG. 6 illustrates an example stream selection block of the adaptive stream manager implemented in accordance with various aspects.
Figure 7:
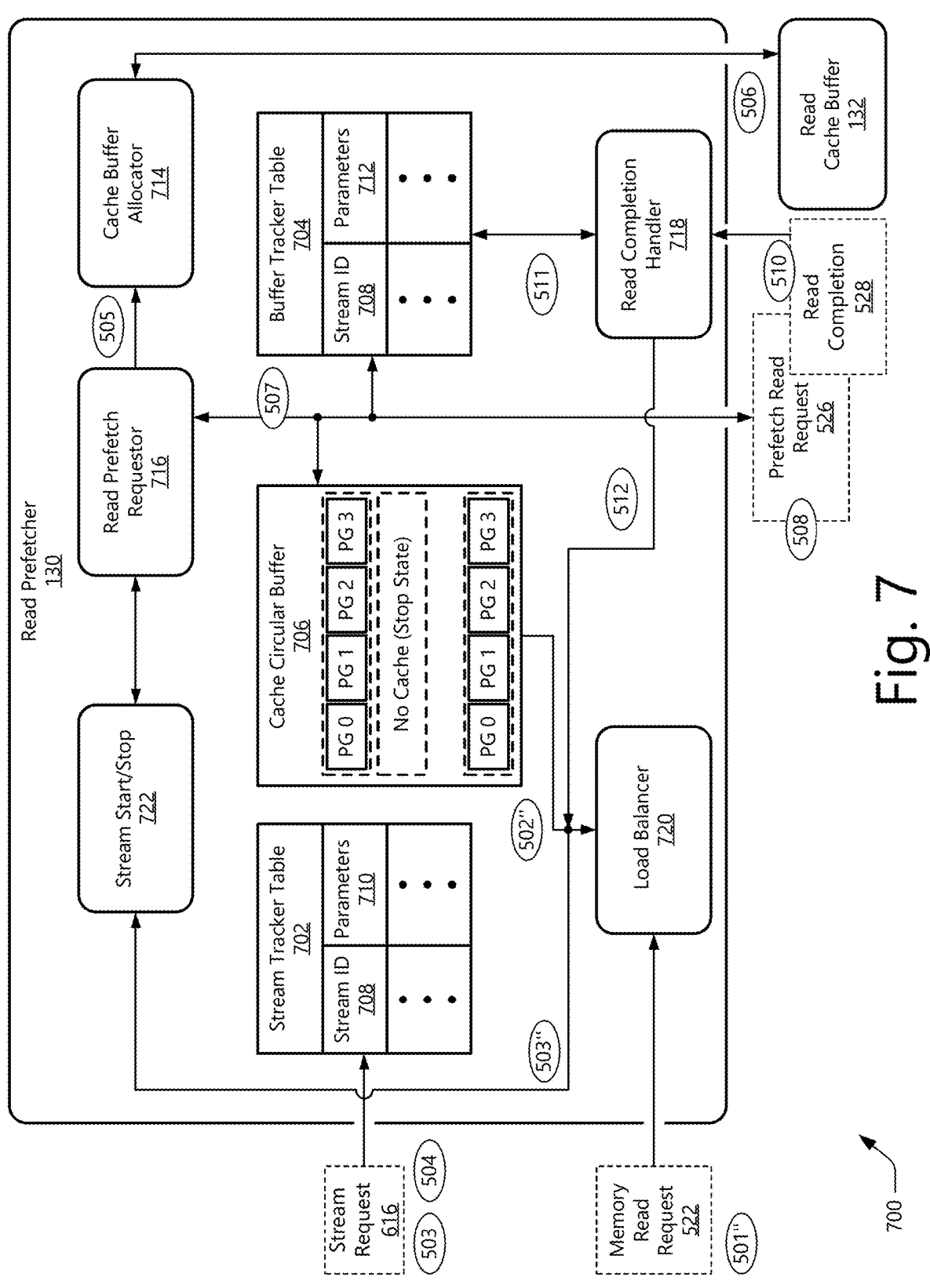
FIG. 7 illustrates an example read prefetcher of the adaptive stream manager implemented in accordance with various aspects.
Figure 8:
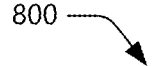
FIG. 8 illustrates additional examples of the device stream tracker table and the buffer tracker table of FIG. 7.

By way of example, consider FIG. 6 which illustrates at 600 an instance of stream selection block 128 implemented in accordance with various aspects. As shown in FIG. 6, the stream selection block 128 may include a host priority table 602, a traffic class priority table 604, and a sequential stream selector 606 configured to receive information from the tables 602, 604. In some implementations, the host priority table 602 may associate host IDs 608 of media requests received with a respective host priority level 610, which may be assigned by a manager or administrator of a media system based on any suitable criteria. Thus, each entry of the host priority table may include a host ID 608 and an associated host priority level set or determined by the adaptive stream manager 122. For example, a host priority level 610 may be assigned based on a QoS associated with a particular host or tenant of a host system, with multiple hosts, tenants, or applications having same or different host priority levels. The traffic class priority table 604 (TC table 604) may include entries for traffic classes 612 (TCs 612 or request QoS levels) and an associated TC priority level 614 that is assigned or determined by the adaptive stream manager 122. In some implementations, the adaptive stream manager 122 can be configured to assign or determine a TC priority level to the traffic classes of incoming requests from hosts based on traffic classes or QoS levels indicated by the requests.

In aspects, a read request (or command) may be configured with a flag or indicator to indicate whether a read request is part of a stream transaction (e.g., sequential read or stream). As shown in FIG. 6, the memory request 522 at 501 may include, being configured in accordance with aspects described herein, information indicating a read address, a tag, a traffic class indicator, and/or stream transaction indicators for whether the request is for a sequential read, a start of a sequential read stream, or an end of the sequential read stream. The host 102 may also provide read priority information 524 (e.g., read prefetch settings) that includes indications of a request type (Host ID or TC), host identifier or address and traffic class, or an updated priority (new priority) for an existing stream transaction. The adaptive stream manager 122 may receive this read priority information 524 and update the host priority table 602 or the TC priority table 604 accordingly. In other words, the stream selection block 128 may use the host priority levels 610 and the traffic class fields 612 of received requests to prioritize stream transactions and read prefetch activity.

In aspects, the stream selection block 128 may manage allocation and execution of a configurable number (e.g., maximum number N) of stream transactions with respective media devices, such as SSDs or DRAM modules coupled to the adaptive stream manager. In some implementations, the number of stream transactions managed by the stream selection block may be determined based on a size or configuration of a cache buffer of the adaptive stream manager. At 502, the stream selection block 128 can determine a stream transaction priority level for a read request based on information of the host priority table 602 and/or the TC priority table 604. In aspects, the criteria or formula implemented by the stream selection block 128 to determine the stream transaction priority level is configurable, such that a system designer or administrator can adjust weightings applied to host priority levels 610 or TC priority levels 614 when determining a stream transaction priority level associated with a read request for a stream transaction or sequential stream.

Generally, the stream selection block 128 may allocate stream transaction identifiers (stream transaction IDs) and associated resources to the requests for stream transactions based on corresponding stream transaction priority levels. In some implementations, the stream selection block 128 uses the host ID and determined stream transaction priority level to allocate or assign the stream transaction ID to the read request of the host. By way of example, the sequential stream selector 606 may use the information from the host priority table 602 and the TC priority table 604 to determine a stream transaction priority level for a read request and generate, at 503, a stream transaction request 616 (stream request 616) to the read prefetcher 130. In other words, a start stream notification can be sent on a selected stream transaction ID (e.g., device stream ID) where the host ID and traffic class are used for prioritizing the start of the stream transaction. Generally, stream transaction requests can be assigned a priority at initialization or a management request (e.g., CXL.io) can be used to adjust or change priorities for these parameters, such as by sending updated read priority information 524 to set a new priority for a stream transaction.

When the adaptive stream manager 122 has a maximum number of stream transactions active or queued, the stream selection block may determine when or if a new stream transaction can be initiated based on the priority level of the stream transaction request. For example, if a new stream transaction request has higher priority than other existing active stream transactions, the sequential stream selector 606 can send an "end stream request" on a stream transaction with a lower or lowest priority level (e.g., based on stream tracker table 702). When the sequential stream selector 606 ceases or deallocates a stream transaction ID and/or resources from an active stream transaction, the stream transaction ID can then be allocated to another stream transaction request effective to initiate that stream transaction. Generally, when the stream selection block 128 assigns a priority to a stream transaction request that is lower than respective priority levels of active or queued stream transactions, the sequential stream selector 606 may ignore the stream request and add the stream transaction request to an allocation-waiting link-list (waiting link-list) as described herein. At 504, when the sequential stream selector 606 issues a stream transaction request to the read prefetcher 130, the stream transaction request 616 may include information associated with the stream transaction, such as the host ID, read parameters, an indication of stream start, an indication of stream end, or the like. Based on the information associated with the stream transaction request 616, the read prefetcher 130 may update a stream tracker table, which may enable status tracking of the stream transaction and maintain details associated with the stream transaction. In aspects, the stream tracker table can be used for allocation of stream transaction IDs (or device stream IDs) and initiating the stream transaction associated with or on a stream transaction ID.

Returning to FIG. 5, the stream selection block 128 may provide an allocated stream transaction or an allocated stream request to the read prefetcher 130 in accordance with one or more aspects. Based on active or pending stream transactions, the read prefetcher 130 can issue prefetch read requests 526 to the read request processor 134 and/or receive read completions 528 from the storage media 124. Continuing the present example, consider FIG. 7, which illustrates at 700 an example read prefetcher in accordance with various aspects. Generally, the read prefetcher 130 can process stream transaction requests received from the stream selection block 128 to initiate stream transactions or terminate stream transactions. The read prefetcher 130 may include data structures useful to track stream transaction IDs, respective resources (e.g., cache areas) allocated to the stream transaction IDs, and parameters associated with the stream transaction IDs.

In this example, the read prefetcher includes a device stream transaction tracker table 702 (stream tracker table 702) and a buffer tracker table 704, which is configured to track respective allocations of a cache circular buffer 706 to the stream transactions. The stream tracker table 702 may receive stream requests 616 from the stream selection block 128 and store stream transaction IDs 708 with corresponding stream transaction parameters 710. The buffer tracker table 704 can indicate and/or track status or progress of stream transactions, and may include stream transaction ID entries 708 and tracking parameters 712. As another example, consider FIG. 8 in which examples of a device stream tracker table 702 and the buffer tracker table 704 are illustrated. The stream transaction IDs 708 may be used to track a number of stream transactions of 1 to N, where N is any suitable integer.

In aspects, the stream tracker table 702 maintains the stream transaction IDs 708 with corresponding stream parameters 710, which may include a stream status, a start read address of the stream, a size or length of the stream (not shown), a host ID of the originating host, a traffic class (e.g., assigned to the read request), and a stream transaction priority level. As described herein, the adaptive stream manager 122 or stream selection block 128 may determine stream transaction priority level based on a host ID, traffic class, QoS, or other information relating to received read requests. The buffer tracker table 704 may also include a stream transaction ID 708 entry with respective tracking parameters 712 for stream transactions or sequential streams. In this example, the tracking parameters 712 of a stream transaction include a page state, active request information, and a read address, which may reflect the status and/or progress of the stream transaction or sequential stream. With reference to page state or page information of a stream transaction, a unit of data, e.g., 4K and its page states may include: (i) page_data_init, (ii) page_data_requested, (iii) page_data prefetched, and (iv) page_data_read. In aspects, initially a page or all pages may start in the initialization state (i) and then advance iteratively from the requested state (ii) to read state (iv) until a stream is complete or terminated.

Returning to FIG. 7 and at 505, when a stream request 616 is received from the stream selection block 128, such as part of a sequential stream start, the cache buffer allocator 714 can assign or allocate, from the read cache buffer 132 at 506, a set of one or more circular buffers (shown as cache circular buffer 706) to the stream transaction ID 708. In aspects, the buffer tracker table 704 may track, at 507, the respective status or details of these circular buffers assigned to the different stream transactions or sequential streams. Generally, the read prefetch requestor 716 can use the cache circular buffer 706 to issue prefetch read requests 526, at 508, for a memory address of a next portion, page, or chunk of data from the storage media 124. In response to the prefetch read requests 526, the read request processor 134 can return, at 510, read corresponding read completions 582, which the read completion handler 718 can process at 511 and provide metrics for load balancing at 512.

As the read completions 528 are received and processed, the read completion handler 718 or the read prefetch requestor 716 may update the buffer tracker table 704 as the prefetched is stored to the cache circular buffer 706. Alternatively, when a stream request 616 with an end stream indication or flag is received, the read prefetcher 130 may act to end an active stream transaction or deallocate a queued stream transaction. For example, a stop stream request may cause the read prefetcher to deallocate a stream transaction ID 708 assigned to the stream transaction and free the resources, such as lines in the cache circular buffer 706, associated with the canceled or ended stream transaction. By so doing, the freed stream transaction ID 708 and recourses of the read prefetcher 130 may be assigned to a next stream request 616 received from the stream selection block 128.

In some aspects, the read prefetcher 130 may implement flow control when issuing prefetch read requests 526 to the read request processor 134. For example, the read prefetch requestor 716 may periodically (e.g., based on a timer) or randomly issue a prefetch request based on an amount of data received by the read completion handler 718 for a given stream transaction. In some cases, the read prefetch requestor 716 may be configured to maintain one or more cache lines of prefetched data in the cache circular buffer 706, which may ensure that such data is ready for transfer to the host as part of the stream transaction. If sufficient data has been prefetched for the stream transaction, the read prefetch requestor 716 may wait until the host-read is complete on the data of the cache circular buffer 706 before initiating a next prefetch read request 526 for additional data.

In this example, the read prefetcher 130 also includes a load balancer 720, which may be configured to balance bus-side and/or host-side bandwidth between stream transactions and other types of media access requests, such as random reads or other low-latency host requests. In the context of FIGS. 5-9, the load balancer may implement operations 501"-503" to balance traffic of a media controller on which the adaptive stream manager 122 is embodied. Generally, stream transactions or sequential streams may generate a large amount of interface overhead relative other types of media access, which may increase latency of media access. For example, when random read requests are received by a storage or memory system, continuing with active stream transactions and associated prefetch and control activities may utilize excessive bandwidth and increase latency of the random reads from the storage or memory media.

In aspects, the load balancer 720 may monitor, at 501", incoming read requests to calculate an amount of device-side bandwidth consumed by access activity, such as stream transactions and/or other types of access requests, which may result in the throttling of prefetching activity to prevent latency issues for host reads. At 502", the load balancer 720 determines an amount of device-side (e.g., memory or storage device) interface traffic that a read prefetch of the stream transaction memory request will generate. In some aspects, the load balancer 720 may compare the amount of device-bus-interface bandwidth utilization for the combined stream transaction prefetch and the random reads to a threshold, and if the bandwidth utilization exceeds the threshold, the load balancer 720 can pause one or more stream transactions at 503". When pausing the one or more stream transactions to reduce interface utilization, the load balancer 720 may pause a lower or lowest priority stream transaction. After the random or other types of access requests are served (e.g., based on threshold comparison), the load balancer 720 may resume the one or more stream transactions for data prefetch.

Figure 9:
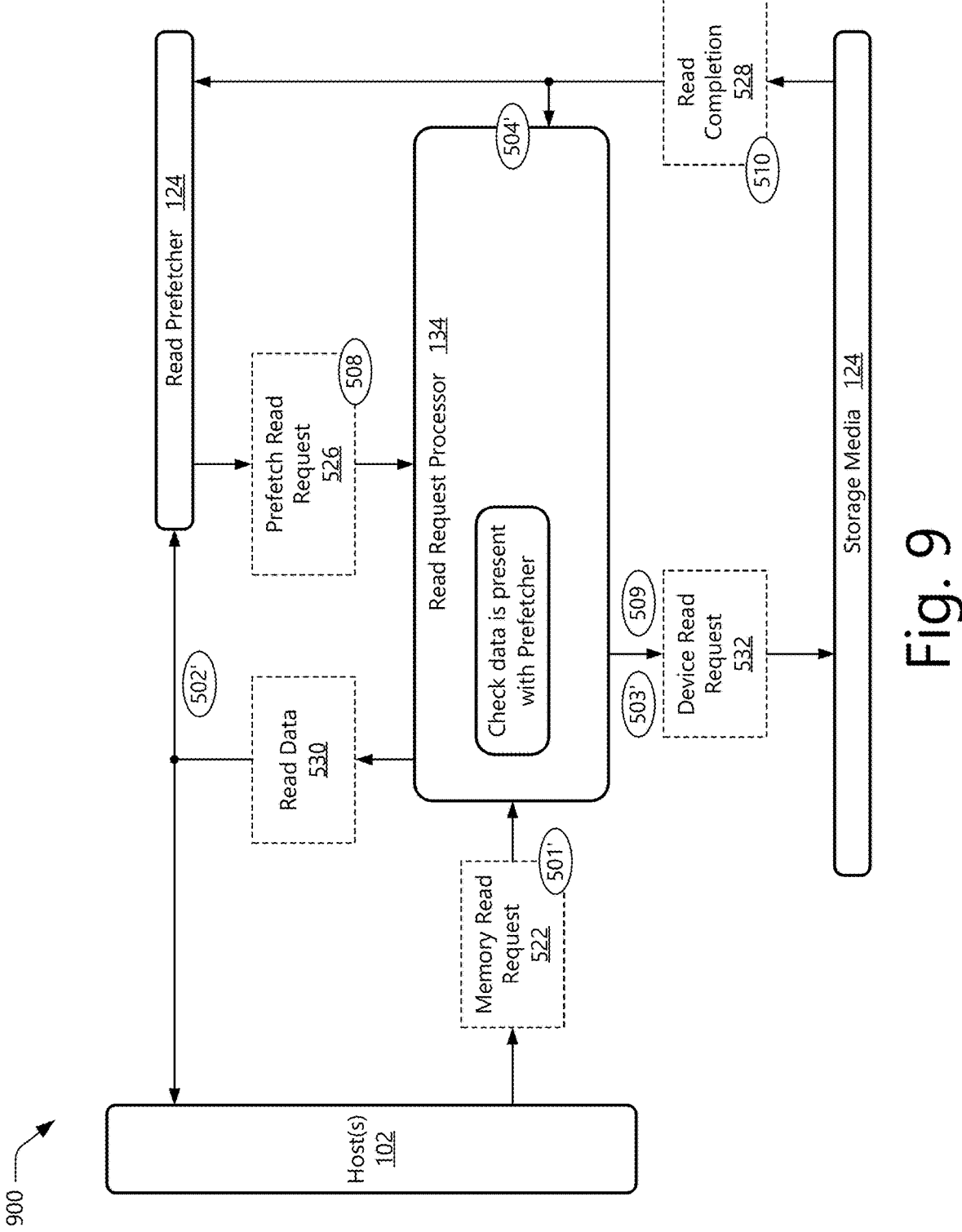
FIG. 9 illustrates an example read request processor of the adaptive stream manager implemented in accordance with various aspects.

FIG. 9 illustrates at 900 an example read request processor of an adaptive stream manager implemented in accordance with various aspects. Generally, the read request processor can facilitate and manage data movement between the host(s) 102, read prefetcher 130, and storage media 124 (or memory media). The read request processor may also communicate information with other components of the adaptive stream manager 122, which may include queries for data presently in the read cache buffer, respective status or read requests, and so forth. In the context of FIGS. 5-9, the read request processor may implement operations 501'-504' to process various read requests and data returned to serve those read requests. In aspects, the memory read requests 522 received from the hosts 102 are sent, at 501', to the read request processor 134. In some implementations, any host request will be sent to the read request processor

134 and the read request processor can send, at 502', a corresponding request to the read prefetcher 130 to check if the data of the read request is present in the read cache buffer 132. In response to the query, the read prefetcher 130 can check the buffer tracker table 704 to determine if the data of the read request address is present in the cache buffer. When the data of the read request is present, the read request processor 134 can cause the data to be sent to the host. Alternatively, if a prefetch read request has been issued for the data at 508, the read request processor 134 may wait for the read completion 528 for that data before sending the data to the host. In other cases, such as when no stream transaction is active for the read request, the read request can issue, at 503', a device read request 532 to the storage media 124 for the data. When the read completion 528 returns the data from the storage media 124 at 504', the read request processor can then send the data to the host.

Figure 10:
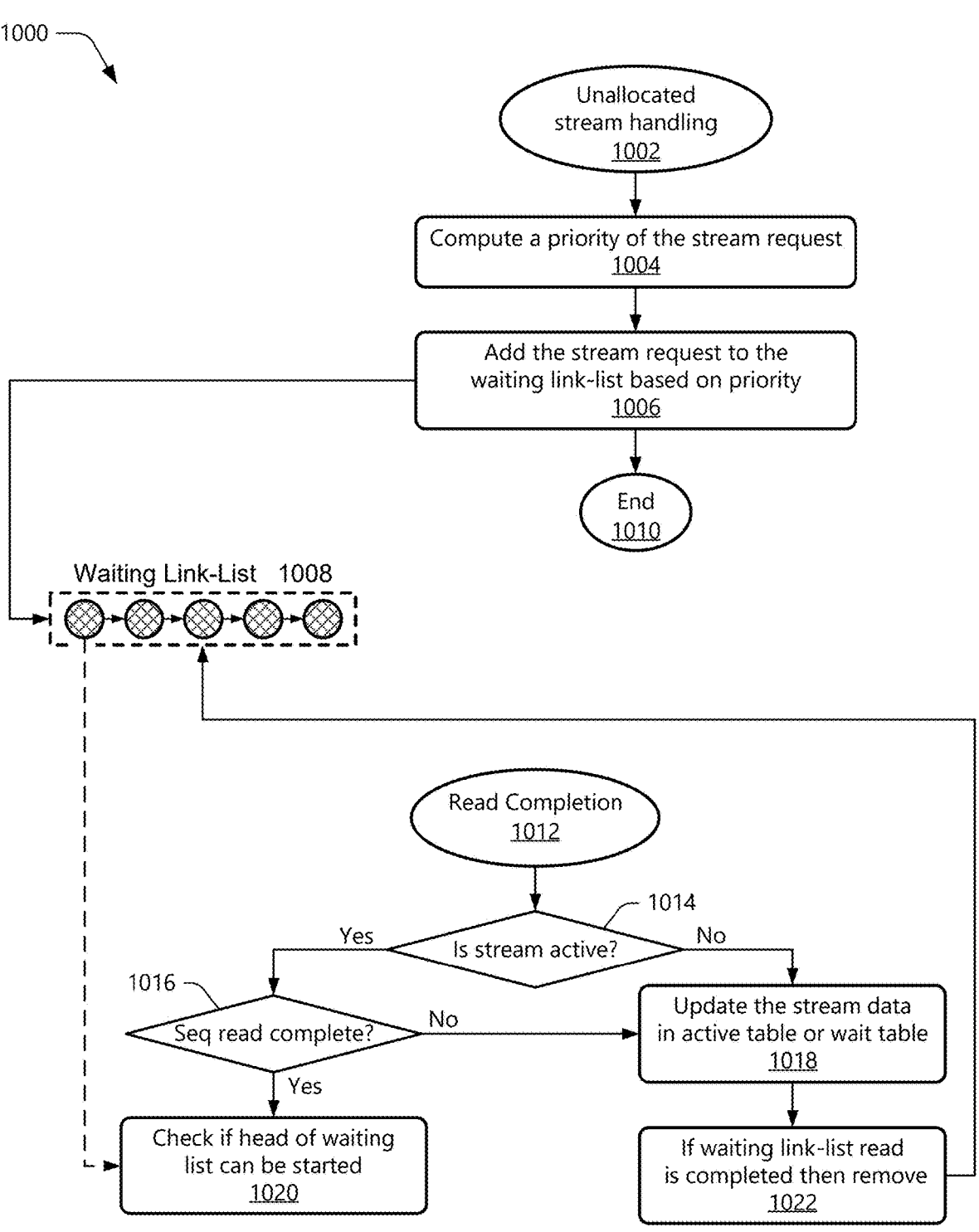
FIG. 10 depicts an example flow chart for stream allocation implemented in accordance with aspects of adaptive stream management.

FIG. 10 depicts at 1000 an example flow chart for stream allocation implemented in accordance with aspects of adaptive stream management. The adaptive stream manager may defer allocation of resources, which may include an identifier and associated cache area, to a host for a stream transaction request until such resources are available. In other words, when a new stream transaction request is received and the corresponding stream transaction resources are not available, the adaptive stream manager 122 may add the stream transaction request to an allocation-waiting link-list (waiting link-list) or queue until the stream transaction resources become available. In aspects, the waiting link-list may be formed and managed (e.g., sorted) based on the priority levels of the stream transaction requests. In some cases, a number of nodes in the waiting link-list may be set based on a system configuration of the media controller (e.g., cache size and tracking table depth). Generally, on completion of a stream transaction, the adaptive stream manager can check the waiting link-list for a next stream transaction to start, such as with resources freed from a previously completed stream transaction.

As shown in FIG. 10, the adaptive stream manager may initiate the process flow for handling unallocated streams at 1002. This process may be implemented when a stream transaction request is received when a stream transaction identifier is not available or there is insufficient bandwidth on the bus-side or host-side interface to start new streams. At 1004, the adaptive stream manager computes a priority for the stream transaction request and adds, at 1006 the stream request to the waiting link-list 1108 of the adaptive stream manager, ending the initial allocation flow at 1010. The operations of 1002 through 1010 may repeat as additional stream transaction requests are received, with the adaptive stream manager adding the additional stream requests to the waiting link-list 1008 based on the priorities of the stream transaction requests.

The adaptive stream manager may implement an iterative read completion process at 1012 at each portion (e.g., block, chunk, or page) of data is read from the media and storage to the cache of the adaptive stream manager. At 1014, the adaptive stream manager determines whether the stream transaction is active. From operation 1014, if the stream transaction is active, the process advances to 1016 at which point the adaptive stream manager determines if the sequential read of the stream transaction is complete. If the stream transaction is not active at 1014, the adaptive stream manager updates the stream transaction data at 1018 in the active stream data tables or the waiting link-list table.

At 1016, if the sequential read of the stream transaction is not complete, the process also moves to operation 1018 to update the stream transaction data. Returning to operation 1016, if the sequential read of the active stream transaction is complete, the adaptive stream manager can free the identifier of the completed stream transaction and, at 1020, check if the stream transaction request at the head of the waiting link-list (highest priority read) can be started with the freed stream transaction identifier. Returning to operation 1018, after updating the stream transaction data in the active stream table or the waiting table, the adaptive stream manager determines, at 1022, if the data fetched completes any of the waiting stream transaction requests. From 1022, the adaptive stream manager can remove one of the waiting stream transaction requests if the data for the request is read from the media, which completes the waiting request in the allocation-waiting link-list (waiting link-list).

FIG. 11 depicts at 1100 an example flow chart for managing host and traffic class priority in accordance with various aspects. In aspects, the adaptive stream manager 122 may pause and/or evict a stream transaction or sequential stream of data read operation. For example, due to overhead associated with stream transactions on the bus-side or host-side interconnect link, the adaptive stream manager may determine to evict an active or in-process stream transaction. Alternatively or additionally, adaptive stream manager may determine to evict lower priority stream transactions in response to receiving a higher priority stream transaction. Thus, the example flow of operations illustrated by FIG. 11 may be implemented for host and host and traffic class priority handling between stream transaction traffic and other types of access traffic, such as random reads, which may have low latency requirements. Although described in reference to stream transaction eviction, the operations described with reference to FIG. 11 may be used to instead pause or suspend lower priority stream transactions, which may enable a media controller to handle other traffic with higher priority or lower latency requirements.

As shown at 1102, the adaptive stream manager 122 determines to initiate the stream eviction process and may access the device stream tracker table 702 to obtain information related to the active or queued stream transactions. At 1104, the adaptive stream manager selects a host ID with a lower or lowest priority (e.g., stream transaction priority) from among the host IDs in the device stream tracker table. At 1106, the adaptive stream manager selects a traffic class with a lower or lowest priority (e.g., stream transaction priority) from the selected host ID. At 1108, the adaptive stream manager then evicts the selected lower priority stream transaction, releasing the identifier of that stream transaction, and uses the stream transaction identifier (stream ID) for starting a new stream. This ends the stream eviction process at 1110 and the adaptive stream manager may allocate the stream ID to a higher priority stream transaction or wait for another event to allocate the stream ID, such as bandwidth utilization decreasing below a threshold.

Figure 12:
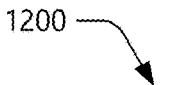
FIG. 12 illustrates an example configuration of a data read request with a control field configured to implement aspects adaptive stream management.

FIG. 12 illustrates at 1200 an example configuration of a data read request with a control field configured to implement aspects of adaptive stream management. Generally, a data read request 1202 may include a stream control field 1204 that is configured to provide indications to an adaptive stream manager 122 for enabling, controlling, or managing stream transactions with storage or memory media. As described herein, the stream control field 1204 may indicate whether the read request is for a stream transaction, that the read request is a start of a stream transaction, that a read request is an end of the stream transaction, a length of the stream transaction, a size of the stream transaction, a number of read operations or data portions of the stream transaction, or the like.

In this example, the stream control field 1204 is implemented with stream control bits 1206, which may include varying numbers of bits depending on a size of the request or command packet. For example, a 68-bit fixed packet (CXL Flit) may be configured with a stream control field 1204 of one to six stream control bits and a 256-bits flit or a port-based routing (PBR) flit may be configured with a stream control field 1204 one to twenty stream control bits. In some cases, this may allow a host or application to provide an indication of a stream transaction, as well as indicate a size or length of the stream transaction. For example, a host may indicate a size of the stream transaction or sequential stream as a multiple of cache line size or width, where a value of 10 can be translated into 10 times a cache line width (64 bytes) for a stream transaction of 640 bytes.

Techniques for Adaptive Stream Management

The following discussion describes techniques for adaptive stream management in accordance with various aspects. These techniques may be implemented using any of the environments and entities described herein, such as the adaptive stream manager 122, stream selection block 128, read prefetcher 130, read cache buffer 132, and/or read request processor 134. These techniques include various methods illustrated in FIGS. 13-15, each of which is shown as a set of operations that may be performed by one or more entities of a media controller.

These methods are not necessarily limited to the orders of operations shown in the associated figures. Rather, any of the operations may be repeated, skipped, substituted, or re-ordered to implement various aspects described herein. Further, these methods may be used in conjunction with one another, with the algorithms of FIG. 10 or FIG. 11, in whole or in part, whether performed by the same entity, separate entities, or any combination thereof. For example, the methods may be combined to implement adaptive stream management to prioritize, allocate, and manage stream transactions of sequential data reads from multiple hosts and/or balance stream transaction traffic with other types of media access requests to efficiently manage resources of a media controller and improve processing of stream transactions and other types of data access requests. In portions of the following discussion, reference will be made to the operating environment 100 of FIG. 1 and various entities, configurations, or algorithms of FIGS. 2-12 and/or FIGS. 16-18 by way of example. Such reference is not to be taken as limiting described aspects to the operating environment 100, media controllers, entities, algorithms, or configurations, but rather as illustrative of one of a variety of examples. Alternatively or additionally, operations of the methods may also be implemented by or with entities described with reference to the SoC of FIG. 16, storage controller of FIG. 17, or memory controller of FIG. 18.

FIG. 13 depicts an example method 1300 for adaptive stream management in accordance with one or more aspects. The operations of the method 1300 may be implemented by an adaptive stream manager 122, stream selection block 128, read prefetcher 130, read cache buffer 132, and/or read request processor 134 of a media controller.

At 1302, an adaptive stream manager receives a read request from a host with an indication for a stream transaction (e.g., sequential stream). In some cases, the read request received from the host includes a stream transaction field with the indication for the stream transaction, as well as an indicator for one of a start of the stream transaction, a QoS parameter of the read request, an end of the stream transaction, a length of the stream transaction, or a size of the stream transaction.

At 1304, the adaptive stream manager determines a priority level for the stream transaction of the host based on an identifier of the host and a traffic class of the read request. In some cases, the adaptive stream manager determines the priority level for the stream transaction based on the QoS parameter of the read request received from the host when a traffic class indicator is absent or not set. Alternatively or additionally, the priority level may be determined based on an identifier of an interface from which the read request is received, such as a virtual channel identifier, PCIe identifier, or CXL identifier of the link.

At 1306, the adaptive stream manager allocates a stream transaction identifier and/or resources to the host for the read request based on the priority level of the stream transaction. Depending on a configuration of the adaptive stream manager, in other implementations the adaptive stream manager may allocate a streaming slot to the host or place the read request into a priority-based queue for processing with other read requests for stream transactions. In some cases, allocating the stream transaction identifier associates or assigns a portion of a cache of the media controller with the stream transaction identifier to enable the stream transaction. Alternatively or additionally, allocating the stream transaction identifier may also associate the priority level of the stream transaction with the stream transaction identifier. The adaptive stream manager may also associate, with the stream transaction identifier, a stream transaction status, a read address, the host identifier, or the QoS indicator of the read request.

At 1308, the adaptive stream manager initiates the stream transaction to prefetch at least a portion of data that corresponds to the read request to a cache of the controller. In some cases, the initiation of the stream transaction is based on the priority level of the stream transaction relative other active or queued stream transactions. For example, the adaptive stream manager may wait until a higher priority stream transaction completes or may pause a lower priority stream transaction before initiating the stream transaction to prefetch the data of the read request.

FIG. 14 depicts an example method 1400 for allocation of stream transaction requests in accordance with various aspects. The operations of the method 1400 may be implemented by an adaptive stream manager 122, stream selection block 128, read prefetcher 130, read cache buffer 132, and/or read request processor 134 of a media controller.

At 1402, the adaptive stream manager receives a request for a stream transaction. The request for the stream transaction or sequential stream may include a read request from a host with an indication for the stream transaction and a traffic class of the read request.

At 1404, the adaptive stream manager determines a priority level for the stream transaction. The adaptive stream manager can determine a priority level for the stream transaction or sequential stream based on an identifier of the host and the traffic class of the read request. In some cases, the adaptive stream manager determines the priority level for the stream transaction based on the QoS parameter of the read request received from the host when a traffic class indicator is absent or not set. The adaptive stream manager may also be configured to use other parameters of the read request to determine the priority level, such as a length of the stream transaction, a size of the stream transaction, whether some of the data of the stream transaction is currently prefetched, or the like.

At 1406, the adaptive stream manager allocates a stream transaction identifier (stream identifier) to the stream transaction. In some cases, there is an available identifier for allocation or the adaptive stream manager may deallocate an identifier from an active or queued stream transaction. Optionally at 1408, the adaptive stream manager adds the stream transaction request to a queue based on the priority level of the stream transaction. For example, the adaptive stream manager may compare the priority level of the stream transaction to other active or queued stream transactions.

The adaptive stream manager may then not allocate a stream transaction identifier to the host for the read request based on the priority level of the stream transaction being lower than the priority levels of the other active or pending stream transactions. Alternatively or additionally, the adaptive stream manager may associate the read request from the host to an allocation-waiting list for stream transaction identifiers. In some cases, the adaptive stream manager associates the read request with a position in the waiting list based on the priority level of the stream transaction relative to other respective priority levels of other stream transactions in the waiting list. At 1410, the adaptive stream manager selects the stream transaction from the stream transaction queue based on the respective priorities of the stream transactions in the queue. For example, the adaptive stream manager may select the stream transaction of the host once the stream transaction identifier reaches the head of the waiting list.

At 1412, the adaptive stream manager initiates the stream transaction using a cache associated with the stream identifier. To initiate the stream transaction, the adaptive stream manager may allocate an area or portion of the cache, such as one or more cache lines of a circular cache buffer. At 1414, the adaptive stream manager reads a portion of the data of the stream transaction from media to the cache associated with the stream identifier. Optionally, the operation 1414 to read portions of data from the media to the prefetch cache may be repeated or iterated until an end of the stream transaction or sequential stream is reached.

At 1416, the adaptive stream manager releases the stream transaction identifier and/or the buffer resources in response to completion of the stream transaction. In response to completion of the stream transaction, the adaptive stream manager may release the identifier of the stream transaction and the assigned area of the prefetch cache buffer, enable these resources to be assigned to a next read request for a stream transaction.

FIG. 15 depicts an example method 1500 for managing stream transactions to balance bandwidth utilization in accordance various. The operations of the method 1500 may be implemented by an adaptive stream manager 122, stream selection block 128, read prefetcher 130, read cache buffer 132, and/or read request processor 134 of a media controller.

At 1502, an adaptive stream manager initiates one or more stream transactions over an interface. The interface may include a bus-side or device-side interface between a host and the media controller or between a media device and the media controller, respectively. At 1504, the adaptive stream manager determines bandwidth utilization of the interface by the one or more stream transactions and other media access activity. In some cases, the adaptive stream manager may receive read requests and compute or estimate interface utilization based on a volume or amount of prefetch data that the adaptive stream manager will need to obtain to serve active stream transactions of the media controller.

At 1506, the adaptive stream manager compares the bandwidth utilization of the interface to a threshold. Alternatively, the adaptive stream manager may monitor latency of other access requests being serviced by the media controller. In some cases, the threshold is a bandwidth utilization threshold that is configured to ensure that the prefetch traffic of the adaptive stream manager does not increase latency of other media access requests (e.g., random reads) to an unacceptable level. For example, the threshold may be configured on latency requirements or QoS requirements for read requests of other hosts access the media.

At 1508, the adaptive stream manager pauses one of the stream transactions in response to the bandwidth utilization exceeding the threshold. Alternatively or additionally, at 1510, the adaptive stream manager can evict one of the stream transactions in response to the bandwidth utilization exceeding the threshold. In some implementations, such as described with reference to FIG. 11, the adaptive stream manager may pause or evict the stream transactions based on the priority levels of the stream transactions.

At 1512, the adaptive stream manager restarts one of the stream transactions. For example, after the random or other types of access requests are served (e.g., as indicated by another comparison of the bandwidth utilization threshold), the adaptive stream manager may resume the one or more stream transactions for data prefetch. When multiple stream transactions have been suspended or evicted, the adaptive stream manager may resume or re-allocate stream transactions to hosts based on the priority levels determined by the stream selector of the adaptive stream manager.

System-on-Chip and Controller

Figure 16:
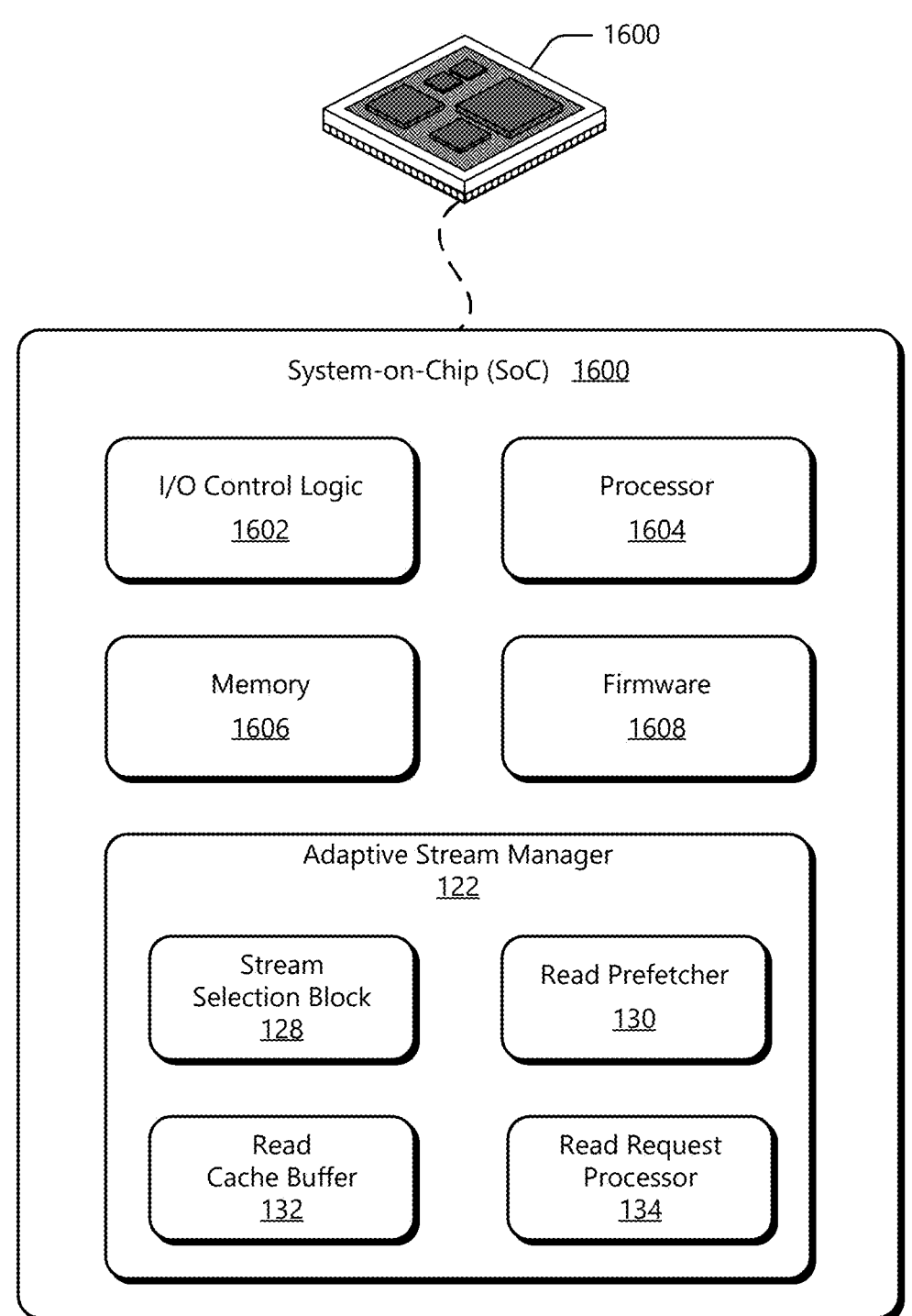
FIG. 16 illustrates an example System-on-Chip (SoC) environment in which aspects of adaptive stream management may be implemented.

FIG. 16 illustrates an example System-on-Chip (SoC) 1600 environment in which various aspects of adaptive stream management for media access may be implemented. The SoC 1600 may be implemented in any suitable system or device, such as a storage device, memory device, router, wireless access point, smart-phone, netbook, tablet computer, access point, network-attached storage, camera, smart appliance, printer, set-top box, server, data storage center, solid-state drive (SSD), hard disk drive (HDD), storage drive array, memory module, automotive computing system, aggregate storage controller, aggregate memory controller, or any other suitable type of device (e.g., others described herein). Although described with reference to a SoC, the entities of FIG. 16 may also be implemented as other types of integrated circuits or embedded systems, such as an application-specific integrated-circuit (ASIC), memory controller, storage controller, communication controller, application-specific standard product (ASSP), digital signal processor (DSP), programmable SoC (PSoC), system-in-package (SiP), or field-programmable gate array (FPGA).

The SoC 1600 may be integrated with electronic circuitry, a microprocessor, memory, input-output (I/O) control logic, media interface, host interface, firmware, and/or software useful to provide functionalities of a computing device, host system, memory system, or storage system, such as any of the devices or components described herein (e.g., storage controller or memory controller). The SoC 1600 may also include an integrated data bus or interconnect fabric (not shown) that couples the various components of the SoC for control signaling, data communication, and/or routing between the components. The integrated data bus, interconnect fabric, or other components of the SoC 1600 may be exposed or accessed through an external port, a parallel data interface, a serial data interface, a fabric-based interface, a peripheral component interface (e.g., PCIe-based interface), or any other suitable data interface. For example, the components of the SoC 1600 may access or control external storage media, external memory, processing blocks, network interfaces, or neural networks, through an external interface or off-chip data interface.

In this example, the SoC 1600 includes various components such as input-output (I/O) control logic 1602 and a hardware-based processor 1604 (processor 1604), such as a microprocessor, a processor core, an application processor, DSP, or the like. The SoC 1600 also includes memory 1606, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 1604 and code stored on the memory 1606 are implemented as a storage controller, memory controller to provide various functionalities associated with adaptive stream management. In the context of this disclosure, the memory 1606 stores data, code, instructions, or other information via non-transitory signals, and does not include carrier waves or transitory signals. Alternatively or additionally, the SoC 1600 may comprise a data interface (not shown) for accessing additional or expandable off-chip media, such as solid-state memory (e.g., Flash or NAND memory), memory media (e.g., DRAM modules or dies), magnetic-based memory media, or optical-based memory media.

The SoC 1600 may also include firmware 1608, applications, programs, software, and/or an operating system, which may be embodied as processor-executable instructions maintained on the memory 1606 for execution by the processor 1604 to implement functionalities of the SoC 1600. The SoC 1600 may also include other communication interfaces, such as a transceiver interface for controlling or communicating with components of a local on-chip (not shown) or off-chip communication transceiver. Thus, in some aspects, the SoC 1600 may be implemented or configured as a communications transceiver that is capable of implementing aspects of adaptive stream management to process data received through a communication channel. Alternatively or additionally, the transceiver interface may also include or implement a signal interface to communicate radio frequency (RF), intermediate frequency (IF), or baseband frequency signals off-chip to facilitate wired or wireless communication through transceivers, PHYs, and MACs coupled to the SoC 1600. For example, the SoC 1600 may include a transceiver interface configured to enable storage over a wired or wireless network, such as to provide a network attached storage (NAS) volume or memory expander with adaptive stream management for communicated data and/or stored data.

The SoC 1600 also includes an adaptive stream manager 122 with a stream selection block 128, read prefetcher 130, read cache buffer 132, and/or read request processor 134, which may be implemented separately as shown or combined with a media controller, host interface, or media interface. In accordance with various aspects of adaptive stream management, the adaptive stream manager 122 receives a read request from a host with an indication for a stream transaction of multiple reads of data from media coupled to the SoC 1600. The adaptive stream manager 122 determines a priority level for the stream transaction based on an identifier of the host and a quality-of-service indicator of the read request. The adaptive stream manager 122 then allocates a stream identifier (stream transaction identifier) to the host for the read request based on the priority level determined for the stream transaction. The stream transaction is initiated to prefetch, from the media, respective data of at least some of the multiple reads to a cache (not shown)

of the SoC 1600. Any of these entities may be embodied as disparate or combined components, as described with reference to various aspects presented herein. For example, the adaptive stream manager 122 may be implemented as part of a storage controller, memory controller, or other media aggregator or accelerator. Examples of these components and/or entities, or of corresponding functionality, are described with reference to the respective components or entities of the environment 100 of FIG. 1, media controllers of FIGS. 2-4, or the respective configurations illustrated in FIG. 5 through FIG. 12, and/or the methods 1300 through 1500 of FIG. 13 through FIG. 15. The adaptive stream manager 122 or components thereof, either in whole or in part, may be implemented as processor-executable instructions maintained by the memory 1606 and executed by the processor 1604 to implement various aspects and/or features of adaptive stream management.

The adaptive stream manager 122 may be implemented independently or in combination with any suitable component or circuitry to implement aspects described herein. For example, the adaptive stream manager 122 may be implemented as part of a DSP, PHY, processor/storage bridge, I/O bridge, graphics processing unit, memory controller, storage controller, arithmetic logic unit (ALU), or the like. The adaptive stream manager 122 may also be provided integrally with other entities of the SoC 1600, such as integrated with the processor 1604, the memory 1606 (e.g., controller cache), the firmware 1608, or media interface of the SoC 1600. Alternatively or additionally, the adaptive stream manager 122, stream selection block 128, read prefetcher 130, read cache buffer 132, read request processor 134, and/or other components of the SoC 1600 may be implemented as hardware, firmware, fixed logic circuitry, or any combination thereof.

Figure 17:
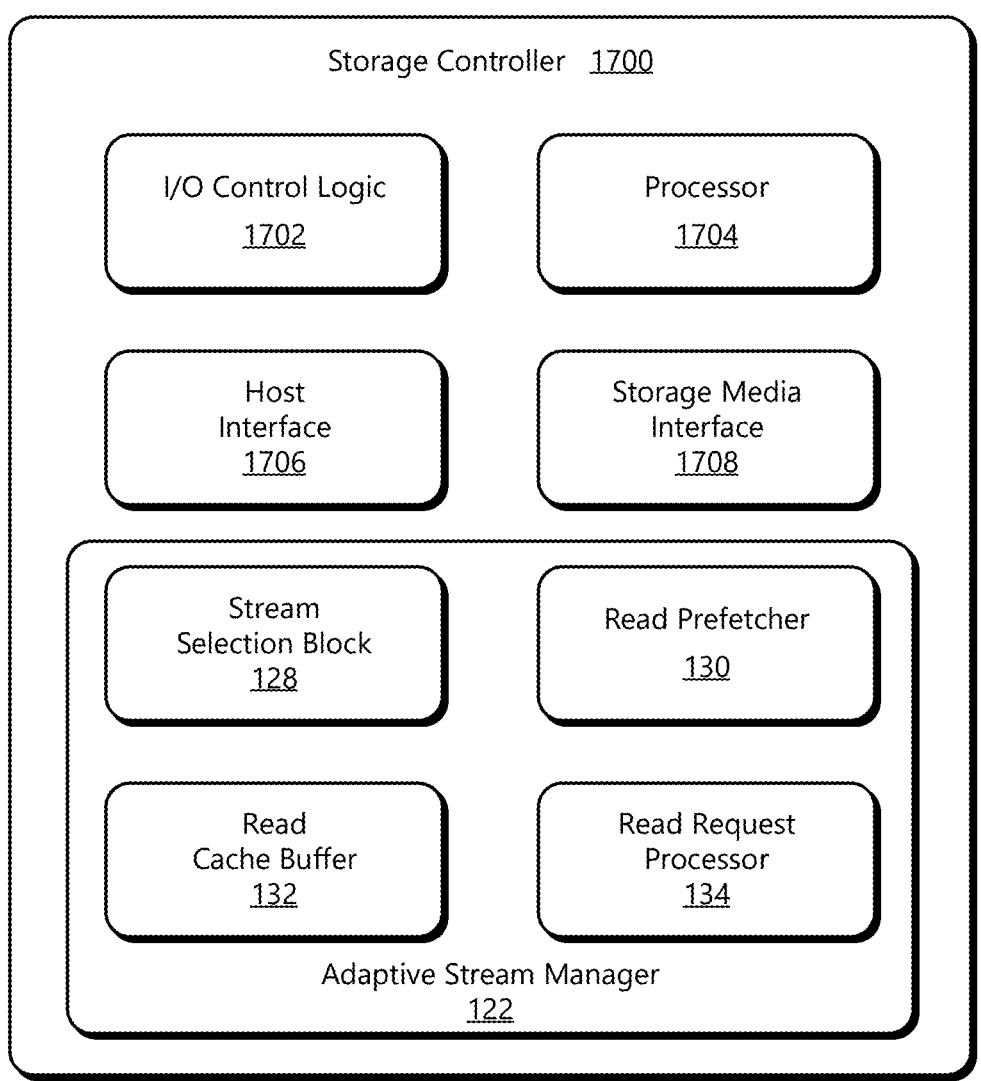
FIG. 17 illustrates an example storage controller in which an adaptive stream manager can be implemented in accordance with one or more aspects.

As another example, consider FIG. 17 which illustrates an example storage controller 1700 in accordance with one or more aspects of adaptive stream management. In various aspects, the storage controller 1700 or any combination of components thereof may be implemented as a storage drive controller, distributed storage center controller (e.g., among a host and SSDs), storage media controller, NAS controller, Fabric interface, NVMe target, or storage aggregation controller for solid-state storage media. In some cases, the storage controller 1700 is implemented similarly to or with components of the SoC 1600 as described with reference to FIG. 16. In other words, an instance of the SoC 1600 may be configured as a storage controller, such as the storage controller 1700 to enable data communication or data routing with aspects of adaptive stream management.

As shown in FIG. 17, the storage controller 1700 includes input-output (I/O) control logic 1702 and a processor 1704, such as a microprocessor, a processor core, an application processor, a DSP, or the like. In some aspects, the processor 1704 and firmware of the storage controller 1700 may be implemented to provide various functionalities associated with adaptive stream management, such as those described with reference to any of the methods 1300 through 1500. The storage controller 1700 also includes a host interface 1706 (e.g., SATA, PCIe, NVMe, or Fabric interface) and a storage media interface 1708 (e.g., NAND interface), which enable access to a host system and storage media, respectively. The storage controller also includes an adaptive stream manager 122 with a stream selection block 128, read prefetcher 130, read cache buffer 132, and/or read request processor 134. In some aspects of adaptive stream management, the adaptive stream manager 122 and components thereof may interact with host interface 1706 and storage media interface 1708 to implement adaptive stream management to prioritize, allocate, and manage stream transactions of sequential data reads from multiple hosts and/or balance stream transaction traffic with other types of storage media access requests to efficiently manage resources of the storage controller and improve processing of stream transactions and other types of data access requests.

Any or all of these components may be implemented separately as shown or combined with the processor 1704, the host interface 1706, and/or the storage media interface 1708 of the storage controller 1700. Examples of these components and/or entities, or of corresponding functionality, are described with reference to the respective components or entities of the environment 100 of FIG. 1, media controllers of FIGS. 2-4, or the respective configurations illustrated in FIG. 5 through FIG. 12. In accordance with various aspects of adaptive stream management, the adaptive stream manager 122 of the storage controller 1700 can receive a read request from a host with an indication for a stream transaction of multiple reads of data from storage media coupled to the storage controller 1700. The adaptive stream manager 122 determines a priority level for the stream transaction based on an identifier of the host and a quality-of-service indicator of the read request. The adaptive stream manager 122 then allocates a stream identifier (stream transaction identifier) to the host for the read request based on the priority level determined for the stream transaction. The stream transaction is initiated to prefetch, from the storage media, respective data of at least some of the multiple reads to a cache (not shown) of the storage controller 1700. By so doing, the adaptive stream manager 122 can prioritize stream transactions among hosts to efficiently manage resources of the storage controller 1700 and improve processing of stream transactions and other types of storage media access requests.

Figure 18:
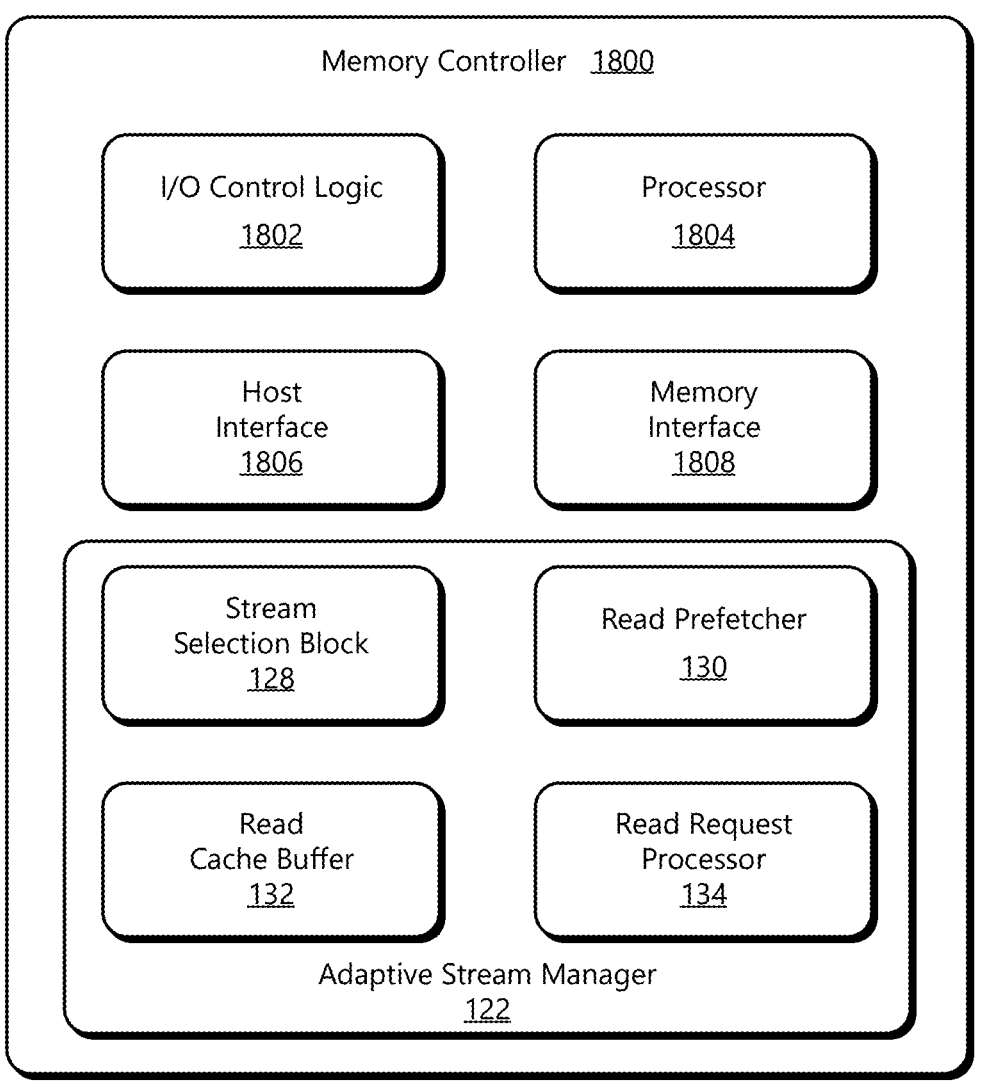
FIG. 18 illustrates an example memory controller in which an adaptive stream manager can be implemented in accordance with one or more aspects.

As yet another example, consider FIG. 18 which illustrates an example memory controller 1800 in accordance with one or more aspects of adaptive stream management. In various aspects, the memory controller 1800 or any combination of components thereof may be implemented as a memory aggregation controller, a memory expander, a memory server unit, a memory expansion card, a CXL device, a memory module controller, distributed memory controller (e.g., among a host and DRAM modules), Fabric interface, or memory pool controller for memory media. In some cases, the memory controller 1800 is implemented similarly to or with components of the SoC 1600 as described with reference to FIG. 16. In other words, an instance of the SoC 1600 may be configured as a memory controller, such as the memory controller 1800 to enable data communication or data routing with aspects of adaptive stream management.

As shown in FIG. 18, the memory controller 1800 includes input-output (I/O) control logic 1802 and a processor 1804, such as a microprocessor, a processor core, an application processor, a DSP, or the like. In some aspects, the processor 1804 and firmware of the memory controller 1800 may be implemented to provide various functionalities associated with adaptive stream management, such as those described with reference to any of the methods 1300 through 1500. The memory controller 1800 also includes a host interface 1806 (e.g., CXL, PCIe, NVMe, or Fabric interface) and a memory interface 1808 (e.g., DRAM interface, memory interconnect), which enable access to a host system and memory media, respectively. The memory controller also includes an adaptive stream manager 122 with a stream selection block 128, read prefetcher 130, read cache buffer 132, and/or read request processor 134. In some aspects of adaptive stream management, the adaptive stream manager 122 and components thereof may interact with host interface 1806 and memory interface 1808 to implement adaptive stream management to prioritize, allocate, and manage stream transactions of sequential data reads from multiple hosts and/or balance stream transaction traffic with other types of memory access requests to efficiently manage resources of the memory controller and improve processing of stream transactions and other types of data access requests.

Any or all of these components may be implemented separately as shown or combined with the processor 1804, the host interface 1806, and/or the memory interface 1808 of the memory controller 1800. Examples of these components and/or entities, or of corresponding functionality, are described with reference to the respective components or entities of the environment 100 of FIG. 1, media controllers of FIGS. 2-4, or the respective configurations illustrated in FIG. 5 through FIG. 12. In accordance with various aspects of adaptive stream management, the adaptive stream manager 122 of the memory controller 1800 can receive a read request from a host with an indication for a stream transaction of multiple reads of data from memory (e.g., DRAM) coupled to the memory controller 1800. The adaptive stream manager 122 determines a priority level for the stream transaction based on an identifier of the host and a quality-of-service indicator of the read request. The adaptive stream manager 122 then allocates a stream identifier (stream transaction identifier) to the host for the read request based on the priority level determined for the stream transaction. The stream transaction is initiated to prefetch, from the memory, respective data of at least some of the multiple reads to a cache (not shown) of the memory controller 1800. By so doing, the adaptive stream manager 122 can prioritize stream transactions among hosts to efficiently manage resources of the memory controller 1800 and improve processing of stream transactions and other types of memory access requests.

Although the subject matter of adaptive stream management has been described in language specific to structural features and/or methodological operations, it is to be understood that the subject matter recited by the appended claims is not necessarily limited to the specific examples, features, configurations, or operations described herein, including orders in which they are performed.

What is claimed is:

1. A method for adaptive stream management implemented by a media controller, comprising:
   receiving, from a host, a read request with an indication for a stream transaction of multiple reads of respective data from media operably coupled to the media controller;
   determining a priority level for the stream transaction of the host based on an identifier of the host and a quality-of-service indicator of the read request;
   allocating a stream transaction identifier to the host for the read request based on the priority level of the stream transaction; and
   initiating the stream transaction to prefetch, from the media coupled to the controller, the respective data of at least one of the multiple reads to a cache of the media controller as part of the stream transaction.

2. The method of claim 1, wherein allocating the stream transaction identifier associates a portion of the cache of the media controller with the stream transaction identifier to enable the stream transaction.

3. The method of claim 1, wherein the read request received from the host includes a stream transaction field that includes the indication for the stream transaction, the stream transaction field configured to indicate at least one of a start of the stream transaction, an end of the stream transaction, a length of the stream transaction, or a size of the stream transaction.

4. The method of claim 1, wherein the read request is a first read request from a first host with a first QoS indicator, the stream transaction is a first stream transaction, and the priority level of the first stream transaction is a first priority level, and the method further comprises:
   receiving, from a second host, a second read request with an indication for a second stream transaction of multiple reads of respective data from the media operably coupled to the media controller;
   determining a second priority level for the second stream transaction of the second host based on an identifier of the second host and a second QoS indicator of the second read request;
   comparing the second priority level of the second stream transaction to the first priority level of the first stream transaction; and
   not allocating another stream transaction identifier to the second host for the second data request based on the second priority level of the second stream transaction being lower than the first priority level of the first stream transaction.

5. The method of claim 4, further comprising associating the second read request from the second host to a waiting list for stream transaction identifiers, the second read request associated with a position in the waiting list based on the second priority level of the second stream transaction relative to other respective priority levels of other stream transactions in the waiting list.

6. The method of claim 1, wherein the read request is from a first host, the stream transaction is a first stream transaction with a first priority level, the stream transaction identifier is a first stream transaction identifier, and the method further comprises:
   comparing, prior to allocating the first stream transaction identifier to the first host, the first priority level of the first stream transaction with a second priority level of a second stream transaction of a second host; and
   deallocating a second stream transaction identifier from the second host based the first priority level of the first stream transaction being higher than the second priority level of the second stream transaction, second or other as first identifier.

7. The method of claim 6, wherein:
   the deallocated second stream transaction identifier is assigned to the first host as the first stream transaction identifier; or
   another stream transaction identifier different from the second stream transaction identifier is assigned to the first host as the first stream transaction identifier.

8. The method of claim 1, wherein allocating the stream transaction identifier associates the priority level of the stream transaction with the stream transaction identifier.

9. The method of claim 8, wherein allocating the stream transaction identifier further associates, with the stream transaction identifier, a stream transaction status, a read address, the host identifier, or the quality-of-service indicator of the read request.

10. The method of claim 1, wherein the quality-of-service indicator of the read request comprises a traffic class of the read request.

11. The method of claim 1, wherein the media controller comprises a storage controller, the media comprises storage media, and the stream transaction comprises a sequential read of the storage media.

12. The method of claim 1, wherein the media controller comprises a memory controller, the media comprises memory media, and the stream transaction comprises a speculative read of the memory media.

13. An apparatus comprising:

media configured to store data;

a media controller that includes a cache and is configured to enable access to the data stored by the media;

a host interface configured to communicate with one or more hosts; and an adaptive stream manager configured to:

receive, from a host, a read request with an indication for a stream transaction of multiple reads of respective data from the media;

determine a priority level for the stream transaction of the host based on an identifier of the host and a quality-of-service indicator of the read request;

allocate a stream transaction identifier to the host for the read request based on the priority level of the stream transaction; and initiate the stream transaction to prefetch, from the media, the respective data of at least one of the multiple reads to the cache of the media controller as part of the stream transaction.

14. The apparatus of claim 13, wherein the allocation of the stream transaction identifier associates a portion of the cache of the media controller with the stream transaction identifier to enable the stream transaction.

15. The apparatus of claim 13, wherein:

the read request of the host includes a stream transaction field;

the indication for the stream transaction is indicated by the stream transaction field; and the stream transaction field is configured to indicate at least one of a start of the stream transaction, an end of the stream transaction, a length of the stream transaction, or a size of the stream transaction.

16. The apparatus of claim 13, wherein the allocation of the stream transaction identifier associates, with the stream transaction identifier, the priority level of the stream transaction, a stream transaction status, a read address of the read request, the host identifier, or the quality-of-service indicator of the read request.

17. A System-on-Chip comprising:

a media controller that includes a cache and is configured to enable access to media operably coupled to the media controller;

a host interface configured to communicate with one or more hosts; and an adaptive stream manager configured to:

receive, from a host, a read request with an indication for a stream transaction of multiple reads of respective data from the media operably coupled to the media controller;

determine a priority level for the stream transaction of the host based on an identifier of the host and a quality-of-service indicator of the read request;

allocate a stream transaction identifier to the host for the read request based on the priority level of the stream transaction; and initiate the stream transaction to prefetch, from the media, the respective data of at least one of the multiple reads to the cache of the media controller as part of the stream transaction.

18. The System-on-Chip of claim 17, wherein the allocation of the stream transaction identifier associates a portion of the cache of the media controller with the stream transaction identifier to enable the stream transaction.

19. The System-on-Chip of claim 17, wherein the quality-of-service indicator of the read request comprises a traffic class of the read request.

20. The System-on-Chip of claim 17, wherein:

the media controller comprises a storage controller, the media comprises storage media, and the stream transaction comprises a sequential read of the storage media; or the media controller comprises a memory controller, the media comprises memory media, and the stream transaction comprises a speculative read of the memory media.

* * * * *